US012587918B2

(12) United States Patent
Zhang

(10) Patent No.: US 12,587,918 B2
(45) Date of Patent: Mar. 24, 2026

(54) METHOD AND DEVICE IN COMMUNICATION NODE FOR WIRELESS COMMUNICATION

(71) Applicant: APOGEE NETWORKS, LLC, Dallas, TX (US)

(72) Inventor: Xiaobo Zhang, Shanghai (CN)

(73) Assignee: APOGEE NETWORKS, LLC, Dallas, TX (US)

( * ) Notice: Subject to any disclaimer, the term of this patent is extended or adjusted under 35 U.S.C. 154(b) by 331 days.

(21) Appl. No.: 17/889,398

(22) Filed: Aug. 17, 2022

(65) Prior Publication Data

US 2022/0400417 A1 Dec. 15, 2022

Related U.S. Application Data

(63) Continuation of application No. PCT/CN2021/080151, filed on Mar. 11, 2021.

(30) Foreign Application Priority Data

Mar. 12, 2020 (CN) .......................... 202010170903.X
Mar. 26, 2020 (CN) .......................... 202010223482.2

(51) Int. Cl.
*H04W 36/00* (2009.01)

(52) U.S. Cl.
CPC . *H04W 36/0079* (2018.08); *H04W 36/00692* (2023.05); *H04W 36/00698* (2023.05)

(58) Field of Classification Search
CPC ........... H04W 24/08; H04W 36/00692; H04W 36/00698; H04W 36/0079; H04W 36/362;
(Continued)

(56) References Cited

U.S. PATENT DOCUMENTS

| 11,452,012 B2 * | 9/2022 | Jiang ................... H04W 36/305 |
| 11,956,692 B2 * | 4/2024 | Kim ...................... H04W 76/19 |

(Continued)

FOREIGN PATENT DOCUMENTS

| CN | 103188744 A | 7/2013 |
| CN | 109661836 A | 4/2019 |

(Continued)

OTHER PUBLICATIONS

Nokia, On RLF reporting; 3GPP TSG-RAN WG-2 Meeting #108, Reno, USA, Nov. 2019; R2-1915497 (Year: 2019).*

(Continued)

*Primary Examiner* — Hirdepal Singh
(74) *Attorney, Agent, or Firm* — Volpe Koenig

(57) ABSTRACT

A method and a device in a communication node for wireless communications are provided in the present disclosure. A communication node receives a first signaling, the first signaling indicating a first candidate cell set; and determines a radio connection failure; and as a response to the determined radio connection failure, selects a first target cell; when the first target cell does not belong to the first candidate cell set, transmits a second signaling, the second signaling comprising first information; when the first target cell is a candidate cell in the first candidate cell set, transmits a third signaling, the third signaling not comprising the first information. The present disclosure proposes a scheme which reports no RLF-related message after recovery of radio connection failure, thus avoiding unnecessary information reporting and reducing signaling overhead, to the benefit of network optimization.

19 Claims, 8 Drawing Sheets

(58) Field of Classification Search
CPC ............. H04W 24/02; H04W 36/0011; H04W 36/0055; H04W 36/0058; H04W 36/0069; H04W 36/08; H04W 36/30; H04W 76/19; H04W 76/27; H04L 5/0053
USPC ........................................................ 455/436
See application file for complete search history.

(56) References Cited

U.S. PATENT DOCUMENTS

| | | |
|---|---|---|
| 2016/0174282 A1 | 6/2016 | Grant et al. |
| 2018/0027457 A1 | 1/2018 | Xu |
| 2020/0015132 A1 | 1/2020 | Liu et al. |
| 2020/0022055 A1 | 1/2020 | Yan |
| 2020/0045602 A1 | 2/2020 | Jiang |
| 2020/0314737 A1* | 10/2020 | Godin ................... H04W 48/16 |
| 2021/0168690 A1 | 6/2021 | Zheng et al. |
| 2022/0217598 A1* | 7/2022 | Ishii .................. H04W 36/0058 |
| 2022/0264401 A1* | 8/2022 | Yan ....................... H04W 24/02 |
| 2022/0330125 A1* | 10/2022 | Ishii ...................... H04W 36/36 |
| 2022/0377630 A1* | 11/2022 | Wu ....................... H04W 76/19 |
| 2023/0040285 A1* | 2/2023 | Parichehrehteroujeni ................... H04W 36/362 |

FOREIGN PATENT DOCUMENTS

| | | |
|---|---|---|
| CN | 110072244 A | 7/2019 |
| CN | 112437496 A | 3/2021 |
| WO | 2018184150 A1 | 10/2018 |
| WO | 2019195060 A1 | 10/2019 |

OTHER PUBLICATIONS

First Office Action of Chinese patent application No. CN202210682762.9 dated Jan. 6, 2024.
First Search Report of Chinese patent application No. CN202210682762.9 dated Jan. 5, 2024.
Second Office Action of Chinese patent application No. CN202010223482.2 dated Nov. 2, 2022.
Supplementary Search Report of Chinese patent application No. CN202010223482.2 dated Oct. 27, 2022.
Notification to Grant Patent Right for Invention of Chinese patent application No. CN202010223482.2 dated Jan. 31, 2023.
Qualcomm Incorporated "Remaining issues on conditional intra-SN PSCell change without MN involvement failure handling" 3GPP TSG-RAN WG2 Meeting #109 Electronic R2-2001150 Feb. 14, 2020.
Samsung "Issues on Fast MCG Link Recovery" 3GPP TSG-RAN WG2 Meeting #106 R2-1906788 May 3, 2019.
Intel Corporation "Report of [108#66][LTE NR Mob] Open issues for LTE and NR mobility (Intel)" 3GPP TSG-RAN WG2 Meeting #109 electronic R2-2000461 Mar. 6, 2020.

CN202010170903.X Notification to Grant Patent Right for Invention dated Apr. 8, 2022.
CN202010170903.X First Search Report dated Mar. 12, 2022.
CN202010223482.2 First Search Report dated Jun. 2, 2022.
CN202010223482.2 First Office Action dated Jun. 9, 2022.
ISR received in application No. PCT/CN2021/080151 dated Jun. 22, 2021.
ZTE Corporation, Sanechips "Discussion on the fast RLF recovery with the applying of CHO and DC " 3GPP TSG RAN WG2 Meeting #107 R2-1910743 Aug. 16, 2019.
OPPO "PCell monitoring during conditional PSCell addition/change"3GPP TSG-RAN WG2 Meeting #107bis R2-1912401 Oct. 3, 2019.
Samsung, Nokia, Nokia Shanghai Bell, Qualcomm Incorporated "Discussion on Performing CHO instead of RRE in CHO"3GPP TSG-RAN WG2 Meeting #107bis R2-1913908 Oct. 4, 2019.
Nokia, Nokia Shanghai Bell "On RLF reporting for CHO and DAPS"3GPP TSG-RAN WG2 Meeting #108 R2-1915497 Nov. 8, 2019.
3rd Generation Partnership Project; Technical Specification Group Radio Access Network; Evolved Universal Terrestrial Radio Access (E-UTRA); Radio Resource Control (RRC);Protocol specification(Release 16) 3GPP TS 36.331 V16.0.0 Feb. 12, 2022.
Third Generation Partnership Project, "Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)," 3GPP TS 37.320 V15.0.0 (Jun. 2018).
Third Generation Partnership Project, "Technical Specification Group Radio Access Network; Evolved Universal Terrestrial Radio Access (E-UTRA) and NR; Multi-connectivity; Stage 2 (Release 16)," 3GPP TS 37.340 V16.0.0 (Dec. 2019).
Third Generation Partnership Project, "Technical Specification Group Radio Access Network; NR; Multiplexing and channel coding (Release 16)," 3GPP TS 38.212 V16.0.0 (Dec. 2019).
Third Generation Partnership Project, "Technical Specification Group Radio Access Network; NR; Physical layer procedures for control (Release 15)," 3GPP TS 38.213 V16.0.0 (Dec. 2019).
Third Generation Partnership Project, "Technical Specification Group Radio Access Network; NR; Physical layer procedures for data (Release 16)," 3GPP TS 38.214 V16.0.0 (Dec. 2019).
Third Generation Partnership Project, "Technical Specification Group Radio Access Network; NR; NR and NG-RAN Overall Description; Stage 2 (Release 16)," 3GPP TS 38.300 V16.0.0 (Dec. 2019).
Third Generation Partnership Project, "Technical Specification Group Radio Access Network; NR; Medium Access Control (MAC) protocol specification (Release 15)," 3GPP TS 38.321 V15.8.0 (Dec. 2019).
Third Generation Partnership Project, "Technical Specification Group Radio Access Network NR Radio Resource Control (RRC) protocol specification (Release 15)," 3GPP TS 38.331 V15.8.0 (Dec. 2019).

* cited by examiner

100A

First Node

Receiving first signaling    101A

Transmitting second signaling when the first target cell does not belong to the first candidate cell set    102A Transmitting third signaling when the first target cell is a candidate cell in the first candidate cell set    103A

100B

First Node

Receiving first signaling    101B

Transmitting second signaling    102B

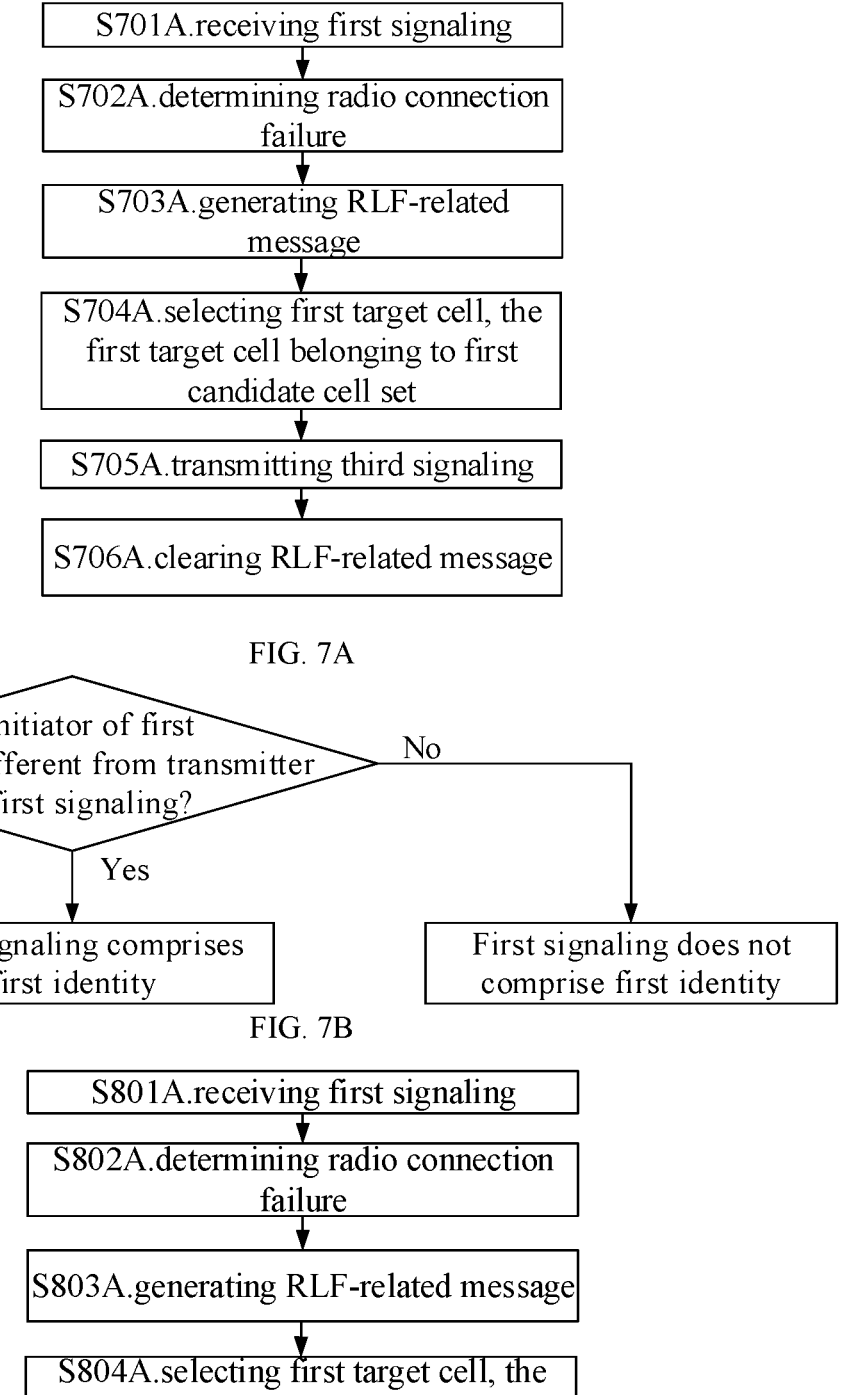

S701A.receiving first signaling

S702A.determining radio connection failure

S703A.generating RLF-related message

S704A.selecting first target cell, the first target cell belonging to first candidate cell set S705A.transmitting third signaling S706A.clearing RLF-related message

FIG. 7A

Is initiator of first signaling different from transmitter of first signaling?

No

Yes

First signaling comprises first identity

First signaling does not comprise first identity

FIG. 7B

S801A.receiving first signaling

S802A.determining radio connection failure

S803A.generating RLF-related message

S804A.selecting first target cell, the first target cell belonging to first candidate cell set S805A.clearing RLF-related message S806A.transmitting third signaling

FIG. 8A

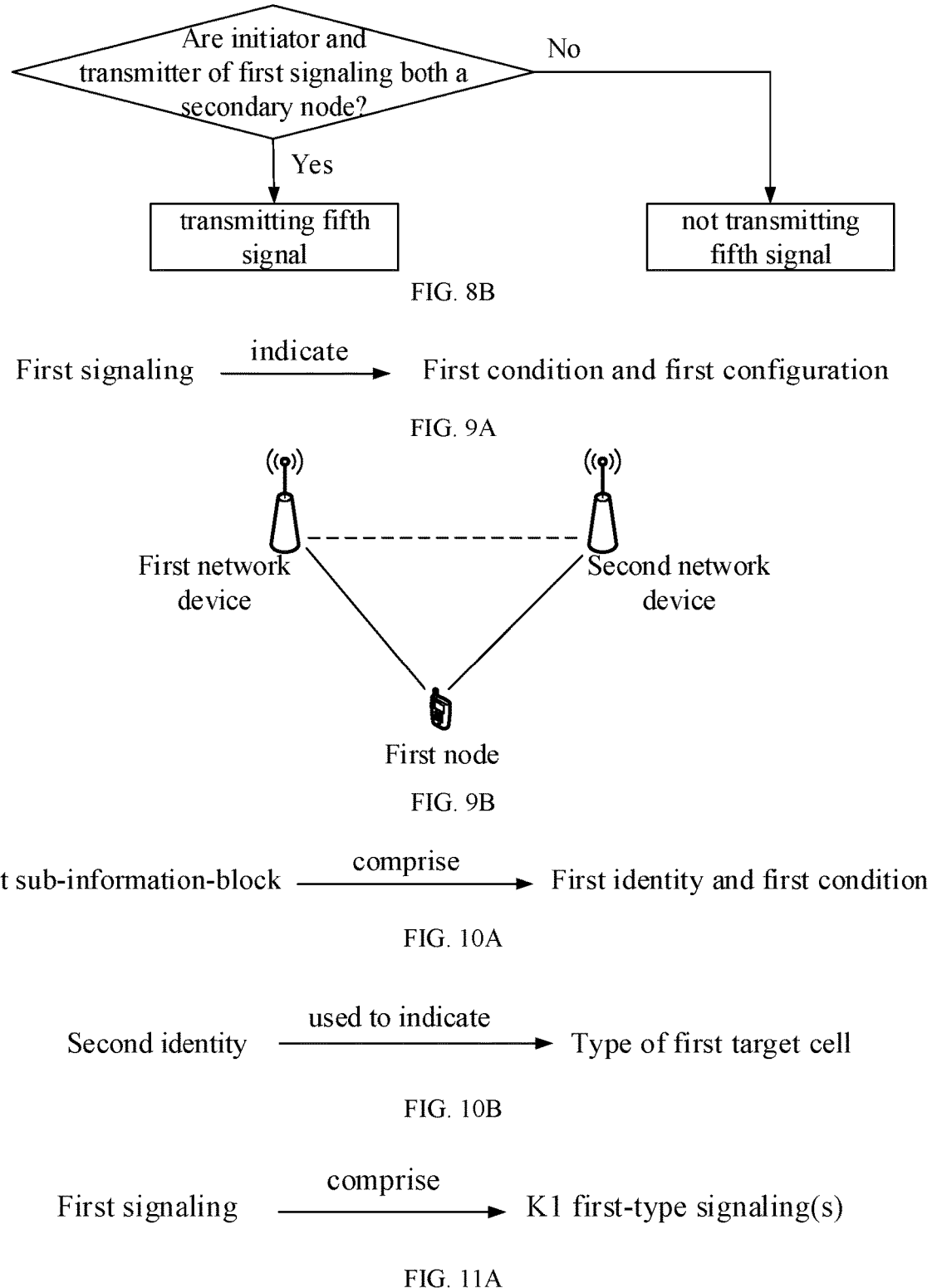

FIG. 8B

First signaling  $\xrightarrow{\text{indicate}}$  First condition and first configuration

FIG. 9A

First network device

Second network device

First node

FIG. 9B

First sub-information-block  $\xrightarrow{\text{comprise}}$  First identity and first condition

FIG. 10A

Second identity  $\xrightarrow{\text{used to indicate}}$  Type of first target cell

FIG. 10B

First signaling  $\xrightarrow{\text{comprise}}$  K1 first-type signaling(s)

FIG. 11A

METHOD AND DEVICE IN COMMUNICATION NODE FOR WIRELESS COMMUNICATION

CROSS-REFERENCE TO RELATED APPLICATION

This application is a continuation application of International Application No. PCT/CN2021/080151, filed Mar. 11, 2021, which claims the priority benefit of Chinese Patent Application Serial Number 202010170903.X, filed on Mar. 12, 2020, and the priority benefit of Chinese Patent Application Serial Number 202010223482.2, filed on Mar. 26, 2020, the full disclosure of which is incorporated herein by reference.

BACKGROUND

Technical Field

The present disclosure relates to transmission methods and devices in wireless communication systems, and in particular to a transmission method and device of Radio Link Failure report or Dual Connectivity.

Related Art

A Radio Link Failure (RLF) report of a User Equipment (UE) can be used for optimizing coverage area and mobility robustness. The UE stores information related to a latest RLF or a Handover Failure (HOF), and then indicates the RLF report's availability during each subsequent Radio Resource Control (RRC) reestablishment and inter-cell handover, until the network acquires the RLF report or detects a HOF 48 hours after the RLF. Self-Organizing Networks (SON) include network self-configuration and self-optimization. A work item (WI) of New Radio (NR) SON/Minimization of Drive Tests (MDT) data collection enhancement was approved at the 3rd Generation Partnership Project (3GPP) RAN #86 to support features of SON data collection, such as mobility enhancement and optimization and handover success report, as well as the UE's historical data contained in E-UTRA NR Dual Connectivity (EN-DC); and to support features of MDT data collection, such as 2-step Random Access Channel (RACH) optimization and RLF reporting. In a WI on NR and Long-Term Evolution (LTE) mobility enhancement, studies have been made in Release 16 to standardize Conditional Handover (CHO), which is supportive of radio link recovery through CHO after an RLF occurs to the UE. Fast Master Cell Group (MCG) recovery was also studied in a WI of enhanced Dual Connectivity and Carrier Aggregation (eDCCA) in Release 16, in which MCG radio link recovery through a Secondary Cell Group (SCG) after an MCG RLF is supported.

When formulating the Release 16 of the 3GPP, the mobility enhancement in NR and LTE has been accomplished to reduce data transmission interruption during a handover period and improve the handover robustness. In a WI of enhanced Dual Connection and Carrier Aggregation (eDCCA) and Mobility Enhancement, discussions were made around Conditional Primary SCG Cell (PSCell) Addition/Change (CPAC) but left unfinished due to a time limit. Therefore, the RAN 86$^{th}$ meeting approved a WI of further enhancement of Multi-Radio Dual-Connectivity (MR-DC) in Release 17, with the CPAC as a focus of the study and supporting some scenarios still uncovered by the Release 16.

SUMMARY

According to versions before Release 16, when an RLF occurs, the UE remains RRC_CONNECTED, and shall select a cell to perform RRC Reestablishment, if there is no such appropriate cell available, the UE enters into an RRC_IDLE state. The R 16 introduces the technique of CHO, and supports radio link recovery through CHO. When a cell selected by the UE is a CHO candidate cell, the UE performs CHO procedures, otherwise the UE performs RRC Reestablishment. When the UE selects a CHO candidate cell and performs CHO, it will recover the radio connection failure by executing RRC Connection Reconfiguration rather than RRC Reestablishment. Since the UE has stored an RLF-related message, an indication that the RLF-related message exists in the UE will be carried in an RRCConnectionComplete message, so that when a base station schedules UEInformation, the UE will report the present RLF. Considering the recovery of the radio connection failure, the UE's reporting of the currently stored RLF information will influence the network optimization and mobility enhancement, hence the need of RLF report enhancement.

To address the above problem, the present disclosure provides a solution. It should be noted that though the present disclosure only took the scenario of recovering by CHO after RLF for example in the statement above, it is also applicable to other scenarios such as Fast MCG Recovery after an MCG failure, where similar technical effects can be achieved. Additionally, the adoption of a unified solution for various scenarios contributes to the reduction of hardcore complexity and costs.

CPAC refers to a network configuration that enables a UE to initiate an access to a candidate PSCell, the candidate PSCell is seen as an appropriate Secondary Node (SN) based on configured condition(s) to be subjected to addition or SN Change, including Intra-SN change. Both the Master Node (MN) and the SN can initiate CPAC, and an Execution Condition can be decided by an MN or an SN. An execution condition for CPAC initiated by an MN is decided by the MN, while an execution condition for CPAC initiated by the SN is decided by the SN. In the meantime, a PCell can also configure a handover based on CHO. If a network side does not indicate any network configuration parameter when configuring a conditional PSCell/PCell change/handover for the UE targeting a candidate cell, the UE will get confused about the network configuration parameter.

In view of the above problem, the present disclosure provides a solution. In the above statement, only the scenario of Dual Connectivity was proposed for example; but the present disclosure is also applicable to scenarios such as multi-connectivity, where similar technical effects can be achieved. Besides, the adoption of a unified solution to varying scenarios contributes to a reduction in hardcore complexity and costs.

It should be noted that if no conflict is incurred, embodiments in any node in the present disclosure and the characteristics of the embodiments are also applicable to any other node, and vice versa. What's more, the embodiments in the present disclosure and the characteristics in the embodiments can be arbitrarily combined if there is no conflict.

The present disclosure provides a method in a first node for wireless communications, comprising:

receiving a first signaling, the first signaling indicating a
        first candidate cell set; determining a radio connection
        failure; and choosing a first target cell as a response to
        the determined radio connection failure;

transmitting a second signaling when the first target cell does not belong to the first candidate cell set, the second signaling comprising a first message; or transmitting a third signaling when the first target cell is a candidate cell in the first candidate cell set, the third signaling not comprising the first message; either of the second signaling and the third signaling is transmitted; herein, the first message is used to determine whether there is a Radio Link Failure (RLF)-related message.

In one embodiment, a problem to be solved in the present disclosure includes that in a convention scheme, a UE after RLF will still report the RLF information even when it performs radio link recovery, thus causing an impact on the network optimization strategy.

In one embodiment, a problem to be solved in the present disclosure includes that when a UE experiences RLF and is in recovery, it will still inform a base station of RLF information on the UE side through an RRC Connection Reconfiguration Complete message.

In one embodiment, a problem to be solved in the present disclosure includes that when RLF occurs to an MCG and the MCG then performs a Fast MCG Recovery through an SCG, RLF information will be stored by a UE, which afterwards will notify a base station of the RLF information it has through an RRC Connection Reconfiguration Complete message.

In one embodiment, a problem to be solved in the present disclosure includes that when RLF occurs in a serving cell and the serving cell starts to recover by CHO, a UE will store the RLF information and get a base station informed of the RLF information stored within through an RRC Connection Reconfiguration Complete message.

In one embodiment, a problem to be solved in the present disclosure includes that when an RLF occurs and is recovered, it won't have much impact on the network coverage optimization and mobility enhancement, while a UE stores the RLF information and makes an RLF report that will increase signaling overhead.

In one embodiment, a problem to be solved in the present disclosure includes that when an RLF occurs and is recovered, to make RLF reporting is to increase the complexity of the network optimization.

In one embodiment, characteristics of the above method include that when an RLF occurs and is recovered, it shall not be counted as an actual RLF.

In one embodiment, characteristics of the above method include that when a CHO cell is selected after an RLF for link recovery, there is no need for RLF reporting.

In one embodiment, characteristics of the above method include that when an MCG that experiences RLF is in a Fast MCG Recovery through an SCG, there is no need for RLF reporting.

In one embodiment, characteristics of the above method include that a cell is selected after RLF, if the selected cell is a CHO cell, a CHO recovery rather than an RRC Reestablishment shall be performed.

In one embodiment, characteristics of the above method include that a cell is selected after RLF, if the selected cell is a part of an MCG, a Fast MCG Recovery rather than an RRC Reestablishment shall be performed.

In one embodiment, an advantage of the above method includes reducing RLF information storage on the UE side.

In one embodiment, an advantage of the above method includes reducing unnecessary RLF reporting.

In one embodiment, an advantage of the above method includes facilitating the optimization of network coverage strategies.

In one embodiment, an advantage of the above method includes facilitating the optimization of mobility robustness.

In one embodiment, an advantage of the above method includes reducing signaling overhead.

In one embodiment, an advantage of the above method includes reducing the complexity of network optimization.

According to one aspect of the present disclosure, comprising:

receiving a second message; and
transmitting a third information set;
herein, the second message is used to trigger transmission of the third information set; the third information set comprises a first sub-information-block, the first sub-information-block comprising the RLF-related message; the first target cell does not belong to the first candidate cell set.

In one embodiment, characteristics of the above method include that when the first target cell belongs to the first candidate cell set, the third information set does not comprise the RLF-related message.

In one embodiment, characteristics of the above method include that when RLF is recovered, the third information set does not comprise the RLF report this time.

In one embodiment, an advantage of the above method includes reducing RLF information storage on the UE side.

In one embodiment, an advantage of the above method includes reducing unnecessary RLF reporting.

According to one aspect of the present disclosure, comprising:

transmitting a fourth signaling; and
receiving a fifth signaling;
herein, the fifth signaling is used to trigger the second signaling.

According to one aspect of the present disclosure, comprising:

generating the RLF-related message as a response to the determined radio connection failure.

In one embodiment, characteristics of the above method include that after an RLF the UE stores an RLF-related message.

According to one aspect of the present disclosure, comprising:

clearing the RLF-related message;
herein, the first target cell is a candidate cell in the first candidate cell set.

In one embodiment, characteristics of the above method include that when a CHO cell is selected, the RLF-related message is cleared.

In one embodiment, characteristics of the above method include that when an MCG cell is selected, the RLF-related message is cleared.

In one embodiment, characteristics of the above method include clearing up the RLF-related message before an RRC Connection Reconfiguration Complete message is transmitted.

In one embodiment, characteristics of the above method include that clearing up the RLF-related message after an RRC Connection Reconfiguration Complete message is transmitted.

In one embodiment, characteristics of the above method include that after the completion of RLF recovery, the RLF-related message is cleared.

In one embodiment, characteristics of the above method include that after the completion of RLF recovery, when a base station schedules a UEInformationRequest, the UE side has cleared up the RLF information.

In one embodiment, an advantage of the above method includes ensuring that the UE does not report the present RLF-related information.

In one embodiment, an advantage of the above method includes reducing the UE-side RLF information storage.

In one embodiment, an advantage of the above method includes prevents the UE from RLF reporting.

According to one aspect of the present disclosure, the above method is characterized in that the first signaling indicates a first condition and a first configuration, the first configuration is associated with the first target cell, and the first target cell fulfilling the first condition is used to trigger application of the first configuration.

In one embodiment, characteristics of the above method include that the CHO configurations comprise an execution condition and RRC configurations for a first target cell.

According to one aspect of the present disclosure, the above method is characterized in that the first sub-information-block comprises a first identity and the first condition, the first identity being used to indicate the first target cell.

In one embodiment, characteristics of the above method include that when an RLF recovery is failed, the UE reports a CHO execution condition.

In one embodiment, an advantage of the above method includes facilitating the optimization of the network coverage strategy.

The present disclosure provides a method in a second node for wireless communications, comprising:

receiving a second signaling when a target cell does not belong to a first candidate cell set, the second signaling comprising a first message; receiving a third signaling when the first target cell is a candidate cell in the first candidate cell set, the third signaling not comprising the first message; either of the second signaling and the third signaling is transmitted;

herein, the first message is used to determine whether there is a Radio Link Failure (RLF)-related message; the first candidate cell set is indicated by a first signaling; and as a response to a radio connection failure, the first target cell is chosen.

According to one aspect of the present disclosure, comprising:

transmitting a second message;

receiving a third information set;

herein, the second message is used to trigger reception of the third information set, the third information set comprising a first sub-information-block, the first sub-information-block comprising the RLF-related message; the first target cell does not belong to the first candidate cell set.

According to one aspect of the present disclosure, comprising:

receiving a fourth signaling; and transmitting a fifth signaling;

herein, the fifth signaling is used to trigger the second signaling.

According to one aspect of the present disclosure, the above method is characterized in generating the RLF-related message as a response to the determined radio connection failure.

According to one aspect of the present disclosure, the above method is characterized in clearing the RLF-related message; herein the first target cell is a candidate cell in the first candidate cell set.

According to one aspect of the present disclosure, the above method is characterized in that the first signaling indicates a first condition and a first configuration, the first configuration is associated with the first target cell, and the first target cell fulfilling the first condition is used to trigger application of the first configuration.

According to one aspect of the present disclosure, the above method is characterized in that the first sub-information-block comprises a first identity and the first condition, the first identity being used to indicate the first target cell.

The present disclosure provides a first node for wireless communications, comprising:

a first receiver, which receives a first signaling, the first signaling indicating a first candidate cell set; determines a radio connection failure; and chooses a first target cell as a response to the determined radio connection failure;

a first transmitter, which transmits a second signaling when the first target cell does not belong to the first candidate cell set, the second signaling comprising a first message; or transmits a third signaling when the first target cell is a candidate cell in the first candidate cell set, the third signaling not comprising the first message; either of the second signaling and the third signaling is transmitted;

herein, the first message is used to determine whether there is a Radio Link Failure (RLF)-related message.

The present disclosure provides a second node for wireless communications, comprising:

a second receiver, which receives a second signaling when a target cell does not belong to a first candidate cell set, the second signaling comprising a first message; receives a third signaling when the first target cell is a candidate cell in the first candidate cell set, the third signaling not comprising the first message; either of the second signaling and the third signaling is transmitted;

herein, the first message is used to determine whether there is a Radio Link Failure (RLF)-related message; the first candidate cell set is indicated by a first signaling; and as a response to a radio connection failure, the first target cell is chosen.

In one embodiment, the present disclosure has the following advantages over the prior art:

When the UE goes through a radio link failure and recovers through CHO, it doesn't need to make an RLF report.

When the UE goes through an MCG failure and performs a Fast MCG Recovery, it doesn't need to make an RLF report.

When the UE goes through a radio link failure and recovers, it doesn't need to make an RLF report.

Signaling overhead is reduced.

A more effective RLF report is provided to the network side.

The present disclosure provides a method in a first node for wireless communications, comprising:

receiving a first signaling; and transmitting a second signaling;

herein, the first signaling is used for radio resource control reconfiguration; the second signaling is used for an acknowledgement of the radio resource control reconfiguration; the first signaling is associated with a first identity, the first identity is related to an initiator of the first signaling, and the first identity is used to determine a receiver of the second signaling; the initiator of the first signaling includes a first network device or a second network device, and the first node is in connection with both the first network device and the second network device, the first network device being associated with a first-type node and the second network device being associated with a second-type node; the first-type node is different from the second-type node.

In one embodiment, a problem to be solved in the present disclosure includes that when the first signaling is transmitted through an SRB1 to the first node, whether the transmitter of the first signaling is the first network device or the second network device shall be indicated.

In one embodiment, a problem to be solved in the present disclosure includes that when the first signaling is transmitted through an SRB1 to the first node, and an SRB3 has already been configured between the first node and the network device, whether the second signaling is transmitted through the SRB1 or the SRB3 shall be indicated.

In one embodiment, characteristics of the above method include that the first identity is used to indicate an initiator of the first signaling.

In one embodiment, characteristics of the above method include that the first identity is used to indicate a receiver of the second signaling.

In one embodiment, characteristics of the above method include that when the first signaling is transmitted through an SRB1, and the SRB3 has been configured, the second signaling is transmitted through the SRB3.

In one embodiment, an advantage of the above method is to avoid forwarding of the second signaling, thus shortening the transmission delay.

According to one aspect of the present disclosure, the above method is characterized in that the first signaling is used to determine a first parameter set, the first parameter set comprises a first condition and a first candidate cell, and the first parameter set is associated with a second identity; the first condition is used to determine whether the first candidate cell is changed to a first target cell, the target cell being a Primary Cell (PCell) in a first cell group, and the first cell group being associated with either the first-type node or the second-type node; the second identity is related to the initiator of the first signaling, or the second identity is related to the first target cell.

In one embodiment, a problem to be solved in the present disclosure includes that when the first node is configured with CPAC or CHO, indication shall be made to the CPAC or the CHO.

In one embodiment, a problem to be solved in the present disclosure includes that when the network decides to offer some conditional configurations of the first node, it ought to be made clear whether the configurations are for a PCell or for a PSCell.

In one embodiment, characteristics of the above method include that the second identity is used to indicate whether a candidate cell and execution condition configured by the network are applied in a PCell or a PSCell.

In one embodiment, characteristics of the above method include that the second identity is used to indicate whether a candidate cell and execution condition configured by the network are from configurations of a master node or of a secondary node.

In one embodiment, an advantage of the above method is to avoid confusion about the network configuration of the first node.

In one embodiment, an advantage of the above method includes that the master node and the secondary node can perform CPAC independently.

In one embodiment, an advantage of the above method includes that the first node performs CHO of a PCell or CPAC of a PSCell by a second identity.

According to one aspect of the present disclosure, comprising:

receiving a third signaling;

herein, the third signaling is used to determine a second parameter set, the second parameter set comprises a second condition and the first candidate cell, and the second parameter set is associated with the second identity; the second condition is used to determine whether the first candidate cell is changed to a first target cell; an initiator of the first signaling is different from that of the third signaling; when the first condition conflicts with the second condition, the first node selects one of the first condition and the second condition to determine whether to change the first candidate cell to the first target cell.

According to one aspect of the present disclosure, comprising:

receiving a fourth signaling;

herein, the fourth signaling is used to determine priority of the first condition or the second condition.

According to one aspect of the present disclosure, the above method is characterized in that when the initiator of the first signaling is different from the transmitter of the first signaling, the first signaling comprises the first identity.

In one embodiment, characteristics of the above method include that when the initiator of the first signaling is the same as the transmitter of the first signaling, the first signaling does not comprise the first identity.

In one embodiment, an advantage of the above method is to reduce the signaling overhead.

According to one aspect of the present disclosure, comprising:

transmitting a fifth signaling;

herein, the fifth signaling is used to indicate that the first candidate cell is changed to the first target cell; a receiver of the fifth signaling is the first network device, or the receiver of the fifth signaling is the second network device.

According to one aspect of the present disclosure, the above method is characterized in that only when the initiator of the first signaling and the transmitter of the first signaling are both a secondary node is the fifth signaling transmitted.

In one embodiment, characteristics of the above method include that the fifth signaling is transmitted only when conditions are fulfilled.

In one embodiment, an advantage of the above method is to reduce the signaling overhead.

The present disclosure provides a method in a network device for wireless communications, comprising:

transmitting a first signaling; and receiving a second signaling;

herein, the first signaling is used for radio resource control reconfiguration; the second signaling is used for an acknowledgement of the radio resource control reconfiguration; the first signaling is associated with a first identity, the first identity is related to an initiator of the first signaling, and the first identity is used to determine a receiver of the second signaling; a receiver of the first signaling is in connection with a first network device and a second network device simultaneously, the network device is either the first network device or the second network device, and the initiator of the first signaling includes the first network device or the second network device, the first network device being associated with a first-type node and the second network device being associated with a second-type node; the first-type node is different from the second-type node.

According to one aspect of the present disclosure, the above method is characterized in that the first signaling is used to determine a first parameter set, the first parameter set comprises a first condition and a first candidate cell, and the first parameter set is associated with a second identity; the first condition is used to determine whether the first candidate cell is changed to a first target cell, the target cell being a Primary Cell (PCell) in a first cell group, and the first cell group being associated with either the first-type node or the second-type node; the second identity is related to the initiator of the first signaling, or the second identity is related to the first target cell.

According to one aspect of the present disclosure, comprising:

transmitting a third signaling;

herein, the third signaling is used to determine a second parameter set, the second parameter set comprises a second condition and the first candidate cell, and the second parameter set is associated with the second identity; the second condition is used to determine whether the first candidate cell is changed to a first target cell; an initiator of the first signaling is different from that of the third signaling; when the first condition conflicts with the second condition, a receiver of the first signaling selects one of the first condition and the second condition to determine whether to change the first candidate cell to the first target cell.

According to one aspect of the present disclosure, comprising:

transmitting a fourth signaling;

herein, the fourth signaling is used to determine priority of the first condition or the second condition.

According to one aspect of the present disclosure, the above method is characterized in that when the initiator of the first signaling is different from the transmitter of the first signaling, the first signaling comprises the first identity.

According to one aspect of the present disclosure, comprising:

receiving a fifth signaling;

herein, the fifth signaling is used to indicate that the first candidate cell is changed to the first target cell.

According to one aspect of the present disclosure, the above method is characterized in that only when the initiator of the first signaling and the transmitter of the first signaling are both a secondary node is the fifth signaling received.

The present disclosure provides a first node for wireless communications, comprising:

a first receiver, which receives a first signaling; and a first transmitter, which transmits a second signaling;

herein, the first signaling is used for radio resource control reconfiguration; the second signaling is used for an acknowledgement of the radio resource control reconfiguration; the first signaling is associated with a first identity, the first identity is related to an initiator of the first signaling, and the first identity is used to determine a receiver of the second signaling; the initiator of the first signaling includes a first network device or a second network device, and the first node is in connection with both the first network device and the second network device, the first network device being associated with a first-type node and the second network device being associated with a second-type node; the first-type node is different from the second-type node.

The present disclosure provides a network device for wireless communications, comprising:

a second transmitter, which transmits a first signaling; and a second receiver, which receives a second signaling;

herein, the first signaling is used for radio resource control reconfiguration; the second signaling is used for an acknowledgement of the radio resource control reconfiguration; the first signaling is associated with a first identity, the first identity is related to an initiator of the first signaling, and the first identity is used to determine a receiver of the second signaling; a receiver of the first signaling is in connection with a first network device and a second network device simultaneously, the network device is either the first network device or the second network device, and the initiator of the first signaling includes the first network device or the second network device, the first network device being associated with a first-type node and the second network device being associated with a second-type node; the first-type node is different from the second-type node.

In one embodiment, the present disclosure is advantageous over the prior art in the following aspects:

Indicating the receiver of the second signaling through the first identity proposed by the present disclosure, thus shortening delay when the UE configures an SRB3.

Indicating an associated network device initiating the CPAC configuration through the second identity proposed by the present disclosure, thus avoiding the UE's confusion about configuration parameters.

Indicating CPAC of the PSCell and CHO of the PCell configured by the network through the second identity proposed by the present disclosure, thus avoiding the UE's confusion about configuration parameters.

BRIEF DESCRIPTION OF THE DRAWINGS

Other features, objects and advantages of the present disclosure will become more apparent from the detailed description of non-restrictive embodiments taken in conjunction with the following drawings:

FIG. 7A illustrates a schematic diagram of generating and clearing RLF-related message according to one embodiment of the present disclosure.

FIG. 7B illustrates a schematic diagram of a condition for the first signaling comprising the first identity according to one embodiment of the present disclosure.

FIG. 8A illustrates a schematic diagram of generating and clearing RLF-related message according to another embodiment of the present disclosure.

FIG. 8B illustrates a schematic diagram of a condition for transmitting a fifth signaling according to one embodiment of the present disclosure.

FIG. 9A illustrates a schematic diagram of a first signaling indicating a first condition and a first configuration according to one embodiment of the present disclosure.

FIG. 9B illustrates a schematic diagram of how a first node relates to a first network device and a second network device according to one embodiment of the present disclosure.

FIG. 10A illustrates a schematic diagram of a first sub-information-block comprising a first identity and a first condition according to one embodiment of the present disclosure.

FIG. 10B illustrates a schematic diagram of a second identity being used to indicate a type of a first target cell according to one embodiment of the present disclosure.

FIG. 11A illustrates a schematic diagram of a first signaling comprising K1 first-type signaling(s) according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1A

Figure 1A:
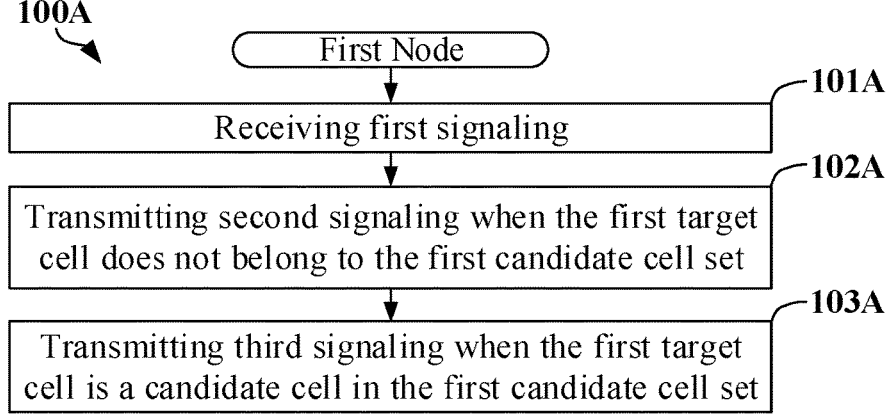
FIG. 1A illustrates a flowchart of transmission of a first signaling, a second signaling and a third signaling according to one embodiment of the present disclosure.

Embodiment 1A illustrates a flowchart of transmission of a first signaling, a second signaling and a third signaling according to one embodiment of the present disclosure, as shown in FIG. 1A. In FIG. 1A, each box represents a step. It should be noted particularly that the order in which the boxes are arranged does not imply a chronological sequence of each step respectively marked.

In Embodiment 1A, the first node in the present disclosure receives a first signaling in step 101A, the first signaling indicating a first candidate cell set; determines a radio connection failure; and selects a first target cell as a response to the determined radio connection failure; and in step 102A, transmits a second signaling when the first target cell does not belong to the first candidate cell set, the second signaling comprising a first message; or transmits a third signaling when the first target cell is a candidate cell in the first candidate cell set, the third signaling not comprising the first message; either of the second signaling and the third signaling is transmitted; herein, the first message is used to determine whether there is an RLF-related message.

In one embodiment, the first signaling is used for configurations for Conditional Handover (CHO), and the CHO refers to a handover that the first node decides to perform when one or more execution conditions are being fulfilled.

In one embodiment, the first signaling is used for configurations for ConditionalPSCellChange (CPC), herein, the PSCell refers to a Primary Secondary Cell Group (SCG) Cell, and the CPC refers to a change to the PSCell that the first node decides to perform when one or more execution conditions are being fulfilled.

In one embodiment, the first signaling is used for configuration for ConditionalPSCellAddition (CPA), herein, the CPA refers to addition to the PSCell that the first node decides to perform when one or more execution conditions are being fulfilled.

In one embodiment, the transmitter of the first signaling includes a maintenance base station for a first serving cell.

In one subembodiment, the first serving cell includes a source serving cell.

In one subembodiment, the first serving cell includes a SourceCell.

In one subembodiment, the first serving cell includes a serving cell where radio connection failure occurs.

In one subembodiment, the first serving cell includes a Source Primary Cell.

In one subembodiment, the first serving cell includes a cell that transmits the first signaling.

In one embodiment, the first signaling is used for configurations for the CHO.

In one embodiment, the first signaling is used for configurations for a candidate cell table of the CHO, the candidate cell table being used for adding/deleting/revising of candidate cells of the PCell.

In one embodiment, the first signaling is used for configurations for adding/altering of the PSCell.

In one embodiment, the first signaling is used for configurations for a candidate cell table for adding/altering of a PSCell, and the candidate cell table is used for adding/deleting/modifying of candidate cells of the PSCell.

In one embodiment, the first signaling is transmitted via an air interface.

In one embodiment, the first signaling is transmitted via a wireless interface.

In one embodiment, the first signaling is transmitted via a higher layer signaling.

In one embodiment, the first signaling comprises a higher layer signaling.

In one embodiment, the first signaling comprises all or part of a higher layer signaling.

In one embodiment, a signaling radio bearer for the first signaling includes a Signaling Radio Bearer 1 (SRB1).

In one embodiment, a signaling radio bearer for the first signaling includes a Signaling Radio Bearer 3 (SRB3).

In one embodiment, the first signaling comprises a Downlink (DL) signaling.

In one embodiment, a logical channel bearing the first signaling comprises a Dedicated Control Channel (DCCH).

In one embodiment, the first signaling comprises a Radio Resource Control (RRC) Message.

In one embodiment, the first signaling comprises all or part of Information Elements (IEs) in an RRC Message.

In one embodiment, the first signaling comprises all or part of fields of an IE in an RRC Message.

In one embodiment, the first signaling comprises a RRCReconfiguration message.

In one embodiment, the first signaling comprises a RRCReconfiguration IE.

In one embodiment, the first signaling comprises a conditionalReconfiguration field.

In one embodiment, the first signaling comprises a ConditionalReconfiguration IE.

In one embodiment, the first signaling comprises a condConfigToAddModList field.

In one embodiment, the first signaling comprises a condConfigToRemoveList field.

In one embodiment, the first signaling comprises an attemptCondReconfig field.

In one embodiment, the first signaling comprises a CondConfigId IE.

In one embodiment, the first signaling comprises a CondConfigToAddModList IE.

In one embodiment, the first signaling comprises a condExecutionCond field.

In one embodiment, the first signaling comprises a condRRCReconfig field.

In one embodiment, the first signaling comprises a RRCConnectionReconfiguration message.

In one embodiment, the first signaling comprises a conditionalReconfiguration IE.

In one embodiment, the first signaling comprises a ConditionalReconfiguration IE.

In one embodiment, the first signaling comprises an attemptCondReconf field.

In one embodiment, the first signaling comprises a condReconfigurationToAddModList field.

In one embodiment, the first signaling comprises a condReconfigurationToRemoveList field.

In one embodiment, the first signaling comprises a ConditionalReconfigurationId IE.

In one embodiment, the first signaling comprises a CondReconfigurationToAddModList IE.

In one embodiment, the first signaling comprises a condReconfigurationToApply field.

In one embodiment, the first signaling comprises a triggerCondition field.

In one embodiment, the phrase that the first signaling indicates a first candidate cell set comprises the meaning that the first signaling comprises all or part of the first candidate cell set.

In one embodiment, the first candidate cell set comprises at least one Inactive serving cell.

In one embodiment, the first candidate cell set comprises multiple serving cells.

In one embodiment, the first candidate cell set comprises K first-type candidate cell(s), K being a positive integer; each of the K first-type candidate cell(s) is selected according to a measurement report by the first node.

In one embodiment, the radio connection failure comprises an MCG RLF.

In one embodiment, the radio connection failure comprises failure in MCG re-configuration with sync.

In one embodiment, the radio connection failure includes RRCReestablishment failure.

In one embodiment, the radio connection failure includes RadioLinkFailure (RLF).

In one embodiment, the radio connection failure includes Handover (HO) Failure.

In one subembodiment, the HO Failure includes CHO Failure.

In one subembodiment, the HO Failure includes Regular Handover Failure.

In one subembodiment, the HO Failure includes Dual Active Protocol Stack (DAPS) Handover Failure (HOF).

In one embodiment, the radio connection failure includes MCG link failure.

In one embodiment, the determined radio connection failure includes that the first node determines that a radio connection with a first serving cell is failed.

In one embodiment, the first node determines a radio connection failure based on a wireless measurement.

In one subembodiment, the wireless measurement is for a first serving cell.

In one subembodiment, the wireless measurement comprises measuring a Synchronization Signal.

In one subembodiment, the wireless measurement comprises a Cell-specific Reference Signal (CRS).

In one subembodiment, the wireless measurement comprises a Synchronization Signal Reference Signal (SS-RS).

In one subembodiment, the wireless measurement comprises a Synchronization Signal Block (SSB).

In one subembodiment, the wireless measurement comprises a Primary Synchronization Signal.

In one subembodiment, the wireless measurement comprises a Secondary Synchronization Signal (SSS).

In one subembodiment, the wireless measurement comprises measuring an SS/PBCH Block.

In one subembodiment, the wireless measurement comprises measuring a Channel State Information Reference Signal (CSI-RS).

In one subembodiment, the wireless measurement comprises measuring a cell-common Physical Downlink Control Channel (PDCCH).

In one subembodiment, the wireless measurement comprises measuring a Physical Broadcast Channel (PBCH).

In one embodiment, when the timer T310 is expired, the first node determines a wireless connection failure.

In one subembodiment, the T310 is for a first serving cell.

In one embodiment, when the timer T312 is expired, the first node determines a wireless connection failure.

In one subembodiment, the T312 is for a first serving cell.

In one embodiment, when an indication that when an indication that a maximum retransmission number is reached is received from MCG Radio Link Control (RLC), the first node determines a radio connection failure.

In one embodiment, when an indication that a maximum retransmission number of an SRB or a DRB is reached is received from MCG RLC, the first node determines a radio connection failure.

In one embodiment, when an indication of random access issue from MCG Medium Access Control (MAC) is received, and none of timers T300, T301, T304, T311 and T319 is running, the first node determines a radio connection failure between a first serving cell.

In one embodiment, when an indication of random access issue from MCG MAC is received, and none of timers T300, T301, T304 and T311 is running, the first node determines a radio connection failure between a first serving cell.

In one embodiment, the first node determines a radio connection failure between a first serving cell, and the first serving cell belongs to an MCG.

In one embodiment, the first target cell is a neighbor cell of a source serving cell.

In one embodiment, the first target cell is a source serving cell.

In one embodiment, the first target cell is a cell selected according to a measurement result.

In one embodiment, the first target cell is a cell selected according to Cell Selection.

In one embodiment, the first target cell comprises a Target Candidate Cell.

In one embodiment, the phrase that "selects a first target cell as a response to the determined radio connection failure" comprises the meaning that after declaring the radio connection failure, the first node selects the first target cell.

In one embodiment, the phrase that "selects a first target cell as a response to the determined radio connection failure" comprises the meaning that after the first node declares the radio connection failure, a cell selected by the first node through performing Cell Selection procedure is the first target cell.

In one embodiment, the phrase that "selects a first target cell as a response to the determined radio connection failure" comprises the meaning that the selection of the first target cell is triggered by the radio connection failure.

In one embodiment, the phrase that "selects a first target cell as a response to the determined radio connection failure" comprises the meaning that after the radio connection failure is determined, the procedure of Cell Selection is triggered, and the cell selected is the first target cell.

In one embodiment, the word response means a next step to be taken.

In one embodiment, the word response means feedback.

In one embodiment, the phrase that the first target cell does not belong to the first candidate cell set comprises the meaning that the first target cell is not a candidate cell in the first candidate cell set.

In one embodiment, the phrase that the first target cell does not belong to the first candidate cell set comprises the meaning that the first target cell is a cell outside the first candidate cell set.

In one embodiment, a receiver of the second signaling includes a maintenance base station for the first target cell, and the first target cell is a cell outside the first candidate cell set.

In one embodiment, the second signaling is transmitted via an air interface.

In one embodiment, the second signaling is transmitted via a wireless interface.

In one embodiment, the second signaling is transmitted via a higher layer signaling.

In one embodiment, the second signaling comprises a higher layer signaling.

In one embodiment, the second signaling comprises all or part of a higher layer signaling.

In one embodiment, the second signaling comprises an RRC message.

In one embodiment, the second signaling comprises all or part of IEs in an RRC message.

In one embodiment, the second signaling comprises all or part of fields of an IE in an RRC message.

In one embodiment, the second signaling is used for RRC Reestablishment procedure.

In one embodiment, the second signaling is used for determining that the RRC Reestablishment is completed.

In one embodiment, a signaling radio bearer for the second signaling includes an SRB1.

In one embodiment, the second signaling comprises an Uplink (UL) signaling.

In one embodiment, a logical channel bearing the second signaling comprises a DCCH.

In one embodiment, the second signaling comprises a RRCReestablishmentComplete message.

In one embodiment, the second signaling comprises a RRCConnectionReestablishmentComplete message.

In one embodiment, the phrase of transmitting a second signaling when the first target cell does not belong to the first candidate cell set means initiating an RRC Reestablishment procedure when the first target cell selected by the first node is not a CHO candidate cell.

In one embodiment, when the first target cell is a candidate cell in the first candidate cell set, and a connection created between the first node and the first target cell is failed, a second signaling is transmitted.

In one embodiment, the phrase that the second signaling comprises a first message means that the second signaling is used to indicate that there is the RLF-related message in the first node.

In one embodiment, the phrase that the first target cell is a candidate cell in the first candidate cell set means that the first target cell belongs to the first candidate cell set.

In one embodiment, a receiver of the third signaling is a maintenance base station for the first target cell.

In one embodiment, the third signaling is transmitted via an air interface.

In one embodiment, the third signaling is transmitted via a wireless interface.

In one embodiment, the third signaling is transmitted via a higher layer signaling.

In one embodiment, the third signaling comprises a higher layer signaling.

In one embodiment, the third signaling comprises all or part of a higher layer signaling.

In one embodiment, the third signaling comprises an RRC message.

In one embodiment, the third signaling comprises all or part of IEs in an RRC message.

In one embodiment, the third signaling comprises all or part of fields of an IE in an RRC message.

In one embodiment, the third signaling is used for RRC Reestablishment procedure.

In one embodiment, the third signaling is used for recovery of the radio connection failure.

In one embodiment, the third signaling is used for determining that the RRC Reestablishment is completed.

In one embodiment, a signaling radio bearer for the third signaling includes an SRB1.

In one embodiment, a signaling radio bearer for the third signaling includes an SRB3.

In one embodiment, the third signaling comprises an uplink signaling.

In one embodiment, a logical channel bearing the third signaling comprises a DCCH.

In one embodiment, the third signaling comprises a RRCConnectionReconfigurationComplete message.

In one embodiment, the third signaling comprises a RRCReconfigurationComplete message.

In one embodiment, the phrase of transmitting a third signaling when the first target cell is a candidate cell in the first candidate cell set comprises the meaning that when the first target cell chosen by the first node is a CHO candidate cell, an RRC Connection Reconfiguration procedure is initiated.

In one embodiment, when the first target cell is a candidate cell in the first candidate cell set, and the first node creates a successful connection with the first target cell, a third signaling is transmitted.

In one embodiment, the phrase of the third signaling not comprising the first message comprises the meaning that the second signaling is used to indicate that there isn't the RLF-related message in the first node.

In one embodiment, when the first target cell does not belong to the first candidate cell set, a second signaling is transmitted, the second signaling comprising a first message; when the first target cell is a candidate cell in the first candidate cell set, a third signaling is transmitted, the third signaling not comprising the first message; either of the second signaling and the third signaling is transmitted.

In one embodiment, the second signaling and the third signaling are different RRC messages.

In one embodiment, a receiver of the second signaling is different from that of the third signaling.

In one embodiment, the phrase that either of the second signaling and the third signaling is transmitted means transmitting the second signaling but not transmitting the third signaling.

In one embodiment, the phrase that either of the second signaling and the third signaling is transmitted means transmitting the third signaling but not transmitting the second signaling.

In one embodiment, the phrase that either of the second signaling and the third signaling is transmitted means that the second signaling and the third signaling are not transmitted simultaneously.

In one embodiment, the first message is used to determine whether there is an RLF-related message in a VarRLF-Report.

In one embodiment, the first message is used to determine whether there is a HOF-related message in a VarRLF-Report.

In one embodiment, the first message comprises all or part of a higher layer signaling.

In one embodiment, the first message comprises all or part of an RRC signaling.

In one embodiment, the first message indicates whether the first node at present stores the RLF-related message.

In one embodiment, the first message indicates whether there is an RLF-related message yet to be reported.

In one embodiment, the first message is used by the receiver for scheduling the first node in reporting UEInformationResponse.

In one embodiment, the first message comprises rlf-InfoAvailable.

In one embodiment, the phrase that the first message is used to determine whether there is an RFL-related message comprises the meaning that the first message is used for explicitly indicating whether there is the RLF-related message.

In one subembodiment, the first message comprises a Boolean value, the Boolean value comprising a True value and a False value.

In one subsidiary embodiment of the above subembodiment, when the first message comprises a True value, the first message indicates that there is the RLF-related message.

In one subsidiary embodiment of the above subembodiment, when the first message comprises a False value, the first message indicates that the RLF-related message does not exist.

In one subsidiary embodiment of the above subembodiment, the True value includes 1, while the False value includes 0.

In one embodiment, the phrase that the first message is used to determine whether there is an RFL-related message comprises the meaning that the first message is used for implicitly indicating whether there is the RLF-related message.

In one subembodiment, when there is the first message, the first message indicates that the RLF-related message exists.

In one subsidiary embodiment of the above subembodiment, the phrase that the RLF-related message exists means that the first message is set as True.

In one subembodiment, when the first message does not exist, the first message indicates that the RLF-related message does not exist.

In one subsidiary embodiment of the above subembodiment, the phrase that the RLF-related message does not exist means that the first message is default.

In one embodiment, the phrase of the second signaling comprising a first message comprises the meaning that there is the first message in the second signaling.

In one embodiment, the phrase of the second signaling comprising a first message comprises the meaning that the first message comprised in the second signaling comprises a True value.

In one embodiment, the phrase of the third signaling not comprising the first message comprises the meaning that there isn't the first message in the third signaling.

In one embodiment, the phrase of the second signaling comprising a first message comprises the meaning that the first message comprised in the second signaling comprises a False value.

In one embodiment, the RLF-related message is generated by the first node.

In one embodiment, the RLF-related message is stored by the first node.

In one embodiment, the RLF-related message is higher-layer information.

In one embodiment, the RLF-related message is related to the radio connection failure.

In one embodiment, the RLF-related message is used to determine a serving cell where the radio connection failure occurs.

In one embodiment, the RLF-related message is used to determine a measurement result related to the radio connection failure.

In one embodiment, the RLF-related message is used to determine a type of the radio connection failure.

In one embodiment, the RLF-related message is used to determine a cause of the radio connection failure.

In one embodiment, the RLF-related message is stored in a VarRLF-Report.

In one embodiment, the RLF-related message comprises information stored in a VarRLF-Report.

In one embodiment, the RLF-related message comprises partial information stored in a VarRLF-Report.

In one embodiment, when the first node detected a radio connection failure, generating and storing the RLF-related message.

In one embodiment, when the first node declares a radio connection failure, generating and storing the RLF-related message.

In one embodiment, after being detected for over 48 hours, the RLF-related message is cleared.

In one embodiment, a latest radio connection failure is used to trigger generation of the RLF-related message.

In one embodiment, the RLF-related message comprises a plmn-IdentityList.

In one embodiment, the RLF-related message comprises a measResultLastServCellIE.

In one embodiment, the RLF-related message comprises a measResultNeighCellsIE.

In one embodiment, the RLF-related message comprises a previousPCellId.

In one embodiment, the RLF-related message comprises a failedPCellId.

In one embodiment, the RLF-related message comprises a connectionFailureType.

In one embodiment, the RLF-related message comprises a rlf-Cause.

In one embodiment, the Message, the IE and the field mentioned in the present disclosure comprise different versions as 3GPP evolution continues.

Embodiment 1B

Figure 1B:
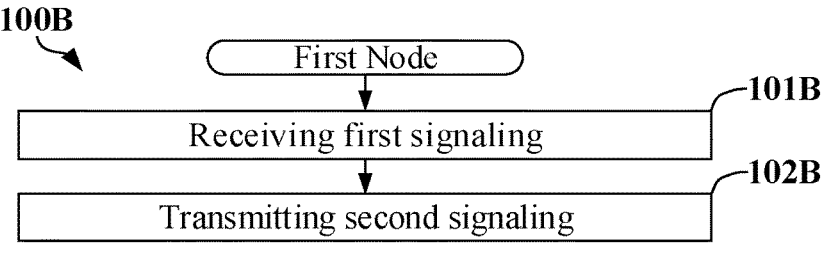
FIG. 1B illustrates a flowchart of transmission of a first signaling and a second signaling according to one embodiment of the present disclosure.

Embodiment 1B illustrates a flowchart of transmission of a first signaling and a second signaling according to one embodiment of the present disclosure, as shown in FIG. 1B. In FIG. 1B, each box represents a step. It should be noted particularly that the order in which the boxes are arranged does not imply a chronological sequence of each step respectively marked.

In Embodiment 1B, the first node in the present disclosure receives the first signaling in step 101B; and transmits the second signaling in step 102B; herein, the first signaling is used for radio resource control reconfiguration; the second signaling is used for an acknowledgement of the radio resource control reconfiguration; the first signaling is associated with a first identity, the first identity is related to an initiator of the first signaling, and the first identity is used to determine a receiver of the second signaling; the initiator of the first signaling includes a first network device or a second network device, and the first node is in connection with both the first network device and the second network device, the first network device being associated with a first-type node and the second network device being associated with a second-type node; the first-type node is different from the second-type node.

In one embodiment, the transmitter of the first signaling includes the first network device.

In one embodiment, the transmitter of the first signaling includes the second network device.

In one embodiment, the first signaling is transmitted via an air interface.

In one embodiment, the first signaling is transmitted via a wireless interface.

In one embodiment, the first signaling is transmitted via a higher layer signaling.

In one embodiment, the first signaling is transmitted via a Uu interface.

In one embodiment, the first signaling is transmitted in DownLink.

In one embodiment, the first signaling is cell-specific.

In one embodiment, the first signaling is UE-specific.

In one embodiment, the first signaling comprises a layer 3 (L3) signaling.

In one embodiment, the first signaling comprises all or part of a higher layer signaling.

In one embodiment, the first signaling comprises an RRC message.

In one embodiment, the first signaling comprises all or part of IEs in an RRC signaling.

In one embodiment, the first signaling comprises all or part of fields of an IE in an RRC signaling.

In one embodiment, a logical channel bearing the first signaling comprises a DCCH.

In one embodiment, a signaling radio bearer of the first signaling comprises an SRB1, the SRB1 being an SRB of an MCG.

In one embodiment, a signaling radio bearer of the first signaling comprises an SRB2.

In one embodiment, a signaling radio bearer of the first signaling comprises an SRB3, the SRB3 being a Direct SRB between a secondary node and the first node.

In one embodiment, the first signaling comprises a RRCReconfiguration message.

In one embodiment, the first signaling comprises a RRCReestablishment message.

In one embodiment, the phrase that the first signaling is used for radio resource control reconfiguration comprises the meaning that the first signaling comprises radio resource control reconfiguration.

In one embodiment, the receiver of the second signaling includes the first network device.

In one embodiment, the receiver of the second signaling includes the second network device.

In one embodiment, the second signaling is transmitted via an air interface.

In one embodiment, the second signaling is transmitted via a wireless interface.

In one embodiment, the second signaling is transmitted via a higher layer signaling.

In one embodiment, the second signaling is transmitted via a Uu interface.

In one embodiment, the second signaling is transmitted in UpLink.

In one embodiment, the second signaling comprises a layer 3 (L3) signaling.

In one embodiment, the second signaling comprises all or part of a higher layer signaling.

In one embodiment, the second signaling comprises an RRC message.

In one embodiment, the second signaling comprises all or part of IEs in an RRC signaling.

In one embodiment, the second signaling comprises all or part of fields of an IE in an RRC signaling.

In one embodiment, a logical channel bearing the second signaling comprises a DCCH.

In one embodiment, a signaling radio bearer of the second signaling comprises an SRB1.

In one embodiment, a signaling radio bearer of the first signaling comprises an SRB2.

In one embodiment, a signaling radio bearer of the second signaling comprises an SRB3.

In one embodiment, when the first signaling is transmitted through an SRB1, and the SRB3 has already been configured, the second signaling is transmitted through the SRB3.

In one embodiment, when the first signaling is transmitted from a master node to the first node, and the SRB3 has already been configured, the second signaling is transmitted from the first node to a secondary node.

In one embodiment, the second signaling comprises a RRCReestablishmentComplete message.

In one embodiment, the second signaling comprises a RRCReconfigurationComplete message.

In one embodiment, the second signaling at least comprises an identity of the first node.

In one embodiment, the phrase that the second signaling is used for an acknowledgement of the radio resource control reconfiguration comprises the meaning that the second signaling is used for making a response to the first signaling.

In one embodiment, the phrase that the second signaling is used for an acknowledgement of the radio resource control reconfiguration comprises the meaning that the second signaling comprises completion of the radio resource control reconfiguration.

In one embodiment, the phrase that the first signaling is associated with a first identity comprises the meaning that the first signaling comprises the first identity.

In one embodiment, the phrase that the first signaling is associated with a first identity comprises the meaning that the first signaling explicitly indicates the first identity.

In one embodiment, the phrase that the first signaling is associated with a first identity comprises the meaning that the first signaling implicitly indicates the first identity.

In one embodiment, the phrase that the first identity is related to an initiator of the first signaling comprises the meaning that the first identity is used to determine the initiator of the first signaling.

In one embodiment, the phrase that the first identity is related to an initiator of the first signaling comprises the meaning that the first identity explicitly indicates the initiator of the first signaling.

In one embodiment, the phrase that the first identity is related to an initiator of the first signaling comprises the meaning that the first identity implicitly indicates the initiator of the first signaling.

In one embodiment, the phrase that the first identity is used to determine a receiver of the second signaling comprises the meaning that the first identity explicitly indicates the receiver of the second signaling.

In one embodiment, the phrase that the first identity is used to determine a receiver of the second signaling comprises the meaning that the first identity implicitly indicates the receiver of the second signaling.

In one embodiment, the phrase that the first identity is used to determine a receiver of the second signaling comprises the meaning that the receiver of the second signaling is related to the initiator of the first signaling.

In one embodiment, when the first identity is equal to a first integer, the receiver of the second signaling is associated with the first-type node; when the first identity is equal to a second integer, the receiver of the second signaling is associated with the second-type node; the first integer is different from the second integer.

In one embodiment, when the first identity is equal to a first integer, the receiver of the second signaling is a master node.

In one embodiment, when the first identity is equal to a second integer, the receiver of the second signaling is a secondary node.

In one embodiment, when the first identity is equal to a first integer, the transmitter of the first signaling is a master node.

In one embodiment, when the first identity is equal to a second integer, the transmitter of the first signaling is a secondary node.

In one embodiment, the phrase that the initiator of the first signaling includes a first network device or a second network device comprises the meaning that the initiator of the first signaling includes the first network device.

In one embodiment, the phrase that the initiator of the first signaling includes a first network device or a second network device comprises the meaning that the initiator of the first signaling includes the second network device.

In one embodiment, the phrase that the first node is in connection with both the first network device and the second network device means that the first node is in communication with the first network device and the second network device through Dual Connectivity.

In one embodiment, the phrase that the first node is in connection with both the first network device and the second network device means that the first node maintains two radio links at the same time for communications, with one being a radio link between the first node and the first network device, and the other being a radio link between the first node and the second network device.

In one embodiment, the phrase of the first network device being associated with a first-type node means that the first network device is the first-type node.

In one embodiment, the phrase of the first network device being associated with a first-type node means that the first network device has same functions as the first-type node.

In one embodiment, the first-type node is a master node, the master node comprising one of an MN and a MeNB.

In one embodiment, the first-type node is a secondary node, the secondary node comprising one of an MN and a MeNB.

In one embodiment, the first-type node is a Centralized Unit (CU).

In one embodiment, the first-type node is a Distributed Unit (DU).

In one embodiment, the phrase of the second network device being associated with a second-type node means that the second network device is the second-type node.

In one embodiment, the phrase of the second network device being associated with a second-type node means that the second network device has same functions as the second-type node.

In one embodiment, the second-type node is a master node, the master node comprising one of an MN and a MeNB.

In one embodiment, the second-type node is a secondary node, the secondary node comprising one of an MN and a MeNB.

In one embodiment, the second-type node is a CU.

In one embodiment, the second-type node is a DU.

In one embodiment, the phrase that the first-type node is different from the second-type node comprises the meaning that the first-type node and the second-type node are respectively associated with different base stations.

In one embodiment, the phrase that the first-type node is different from the second-type node comprises the meaning that the first-type node is a master node, while the second-type node is a secondary node.

In one embodiment, the phrase that the first-type node is different from the second-type node comprises the meaning that the first-type node is a secondary node, while the second-type node is a master node.

In one embodiment, the phrase that the first-type node is different from the second-type node comprises the meaning that the first-type node is the CU, while the second-type node is the DU.

In one embodiment, the phrase that the first-type node is different from the second-type node comprises the meaning that the first-type node is the DU, while the second-type node is the CU.

In one embodiment, the first identity is used to determine the initiator of the first signaling.

In one embodiment, the first identity is used to determine the transmitter of the first signaling.

In one embodiment, the first identity is used to determine the receiver of the second signaling.

In one embodiment, the first identity is used to determine a node that initiates CPAC, and the node initiating the CPAC comprises the first network device and the second network device.

In one embodiment, the first identity is used to determine a radio bearer type of the first signaling.

In one subembodiment, the radio bearer type includes SRB0.

In one subembodiment, the radio bearer type includes SRB1.

In one subembodiment, the radio bearer type includes SRB2.

In one subembodiment, the radio bearer type includes SRB3.

In one embodiment, the first identity includes a Physical Cell Identity (PCI).

In one embodiment, the first identity includes a cell group identity, the cell group identity being used to identify a Cell Group (CG).

In one embodiment, the first identity includes a base station type identity, the base station identity being used to identify a master node or a secondary node.

In one embodiment, the first identity includes a Cell Global Identity (CGI).

In one embodiment, the first identity includes a CellGroupId IE.

In one embodiment, the first identity includes a CellIdentity IE.

Embodiment 2

Figure 2:
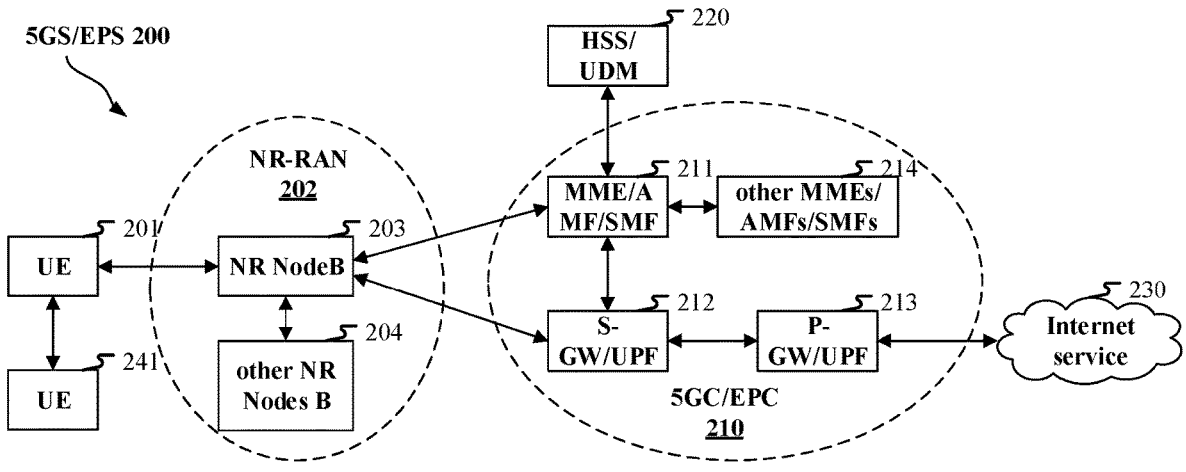
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a network architecture 200 of 5G NR, Long-Term Evolution (LTE), and Long-Term Evolution Advanced (LTE-A) systems. The 5G NR or LTE network architecture 200 may be called a 5G System/Evolved Packet System (5GS/EPS) 200 or other appropriate terms, which may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, vehicle-mounted equipment, vehicle-mounted communications units, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW) 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching (PS) Streaming services.

In one embodiment, the UE201 corresponds to the first node in the present disclosure.

In one embodiment, the UE201 supports transmission in Non-terrestrial Networks (NTN).

In one embodiment, the UE201 supports transmission in large-delay networks.

In one embodiment, the UE201 supports transmission in Terrestrial Networks (TN).

In one embodiment, the UE201 supports Dual Connectivity (DC) transmission.

In one embodiment, the UE201 is a UE.

In one embodiment, the UE201 is a terminal device.

In one embodiment, the UE201 is an Ender.

In one embodiment, the UE201 supports Carrier Aggregation (CA) transmission.

In one embodiment, the gNB203 corresponds to the network device in the present disclosure.

In one subembodiment, the network device includes the first network device in the present disclosure.

In one subembodiment, the network device includes the second network device in the present disclosure.

In one embodiment, the gNB203 corresponds to the second node in the present disclosure.

In one embodiment, the gNB203 corresponds to the third node in the present disclosure.

In one embodiment, the gNB203 corresponds to the fourth node in the present disclosure.

In one embodiment, the gNB203 supports transmission in NTN.

In one embodiment, the gNB203 supports transmission in large-delay network.

In one embodiment, the gNB203 supports transmission in TN.

In one embodiment, the gNB203 supports DC transmission.

In one embodiment, the gNB203 is a MarcoCellular base station.

In one embodiment, the gNB203 is a Micro Cell base station.

In one embodiment, the gNB203 is a PicoCell base station.

In one embodiment, the gNB203 is a Femtocell.

In one embodiment, the gNB203 supports transmission in TN.

In one embodiment, the gNB203 is a base station.

In one embodiment, the gNB203 is a Transmission and Reception Point (TRP).

In one embodiment, the gNB203 is a flight platform.

In one embodiment, the gNB203 is a satellite.

Embodiment 3

Figure 3:
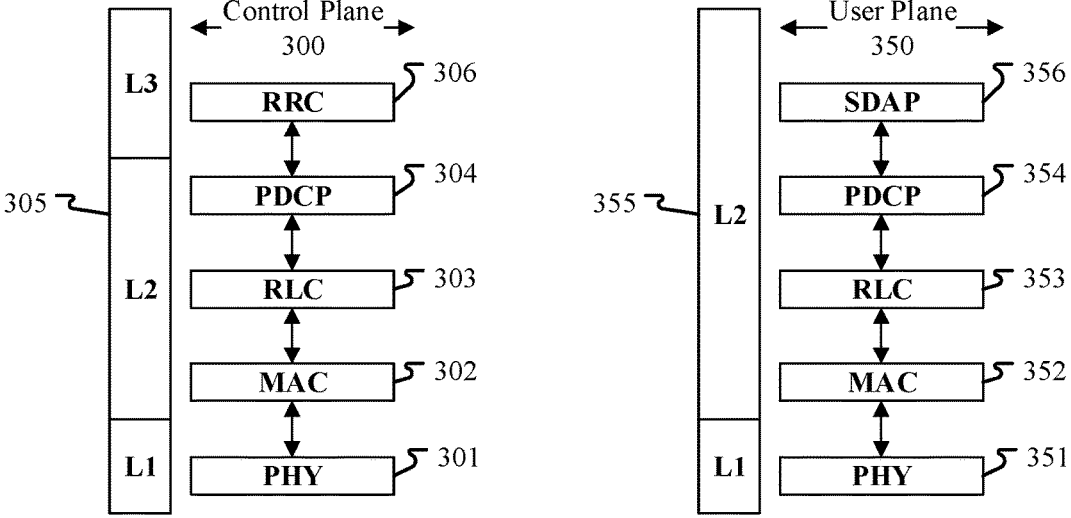
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, comprising a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a packet and provides support for inter-cell handover. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling. The radio protocol architecture in the user plane 350 comprises the L1 layer and the L2 layer. In the user plane 350, the radio protocol architecture used in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the radio protocol architecture in FIG. 3 is applicable to the fourth node in the present disclosure.

In one embodiment, the first signaling in the present disclosure is generated by the RRC 306.

In one embodiment, the second signaling in the present disclosure is generated by the RRC 306.

In one embodiment, the third signaling in the present disclosure is generated by the RRC 306.

In one embodiment, the fourth signaling in the present disclosure is generated by the RRC 306.

In one embodiment, the fifth signaling in the present disclosure is generated by the RRC 306.

In one embodiment, the second message in the present disclosure is generated by the RRC 306.

In one embodiment, the third information set in the present disclosure is generated by the RRC 306.

In one embodiment, the radio protocol architecture in FIG. 3 is applicable to the first node in the present disclosure.

In one embodiment, the radio protocol architecture in FIG. 3 is applicable to the network device in the present disclosure.

In one embodiment, the radio protocol architecture in FIG. 3 is applicable to the first network device in the present disclosure.

In one embodiment, the radio protocol architecture in FIG. 3 is applicable to the second network device in the present disclosure.

In one embodiment, the first signaling in the present disclosure is generated by the RRC 306.

In one embodiment, the first signaling in the present disclosure is generated by the MAC302 or the MAC352.

In one embodiment, the first signaling in the present disclosure is generated by the PHY301 or the PHY351.

In one embodiment, the second signaling in the present disclosure is generated by the RRC 306.

In one embodiment, the second signaling in the present disclosure is generated by the MAC302 or the MAC352.

In one embodiment, the second signaling in the present disclosure is generated by the PHY301 or the PHY351.

In one embodiment, the third signaling in the present disclosure is generated by the RRC 306.

In one embodiment, the third signaling in the present disclosure is generated by the MAC302 or the MAC352.

In one embodiment, the third signaling in the present disclosure is generated by the PHY301 or the PHY351.

In one embodiment, the fourth signaling in the present disclosure is generated by the RRC 306.

In one embodiment, the fourth signaling in the present disclosure is generated by the MAC302 or the MAC352.

In one embodiment, the fourth signaling in the present disclosure is generated by the PHY301 or the PHY351.

In one embodiment, the fifth signaling in the present disclosure is generated by the RRC 306.

In one embodiment, the fifth signaling in the present disclosure is generated by the MAC302 or the MAC352.

In one embodiment, the fifth signaling in the present disclosure is generated by the PHY301 or the PHY351.

Embodiment 4

Figure 4:
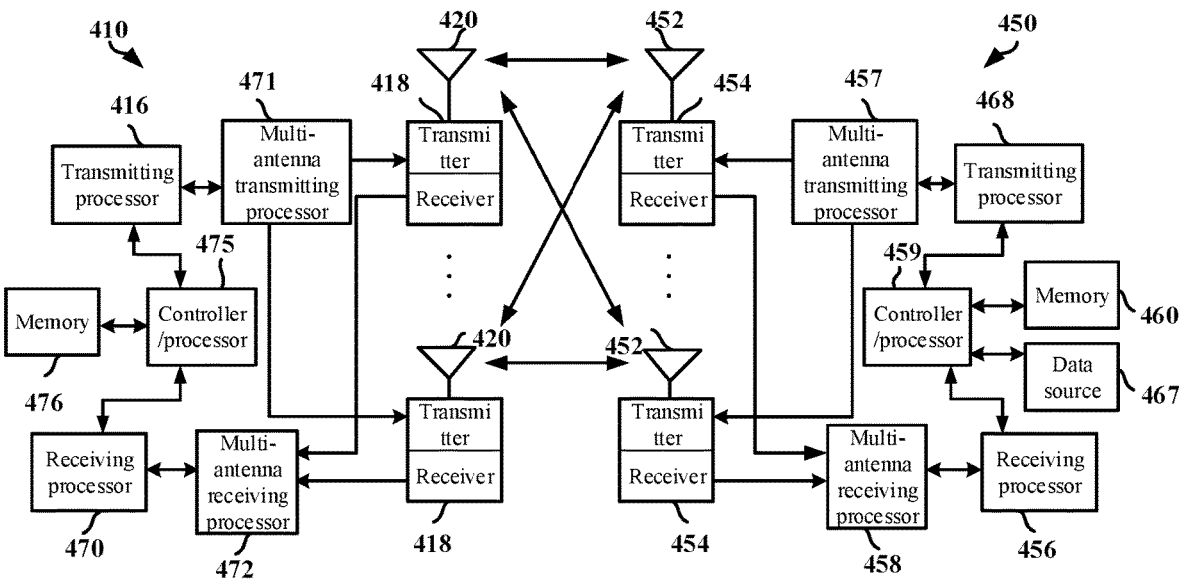
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 implements the functionality of the L2 layer. In the transmission from the second communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the second communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives a first signaling, the first signaling indicating a first candidate cell set; determines a radio connection failure; and chooses a first target cell as a response to the determined radio connection failure; transmits a second signaling when the first target cell does not belong to the first candidate cell set, the second signaling comprising a first message; or transmits a third signaling when the first target cell is a candidate cell in the first candidate cell set, the third signaling not comprising the first message; either of the second signaling and the third signaling is transmitted; herein, the first message is used to determine whether there is an RLF-related message.

In one embodiment, the first communication device 450 comprises a memory that stores a computer readable instruction program. The computer readable instruction program generates actions when executed by at least one processor. The actions include: receiving a first signaling, the first signaling indicating a first candidate cell set; determining a radio connection failure; and choosing a first target cell as a response to the determined radio connection failure; transmitting a second signaling when the first target cell does not belong to the first candidate cell set, the second signaling comprising a first message; or transmitting a third signaling when the first target cell is a candidate cell in the first candidate cell set, the third signaling not comprising the first message; either of the second signaling and the third signaling is transmitted; herein, the first message is used to determine whether there is an RLF-related message.

In one embodiment, the second communication device 410 comprises at least one processor and at least one memory. The at least one memory comprises computer program codes. The at least one memory and the computer program codes are configured to be used in collaboration with the at least one processor. The second communication device 410 at least transmits a first signaling, the first signaling indicating a first candidate cell set; determines a radio connection failure; chooses a first target cell as a response to the determined radio connection failure; and receives a second signaling when the first target cell does not belong to the first candidate cell set, the second signaling comprising a first message; or receives a third signaling when the first target cell is a candidate cell in the first candidate cell set, the third signaling not comprising the first message; either of the second signaling and the third signaling is received. Herein, the first message is used to determine whether there is an RLF-related message.

In one embodiment, the second communication device 410 comprises a memory that stores a computer readable instruction program. The computer readable instruction program generates actions when executed by at least one processor. The actions include: transmitting a first signaling, the first signaling indicating a first candidate cell set; determining a radio connection failure; choosing a first target cell as a response to the determined radio connection failure; and receiving a second signaling when the first target cell does not belong to the first candidate cell set, the second signaling comprising a first message; or receiving a third signaling when the first target cell is a candidate cell in the first candidate cell set, the third signaling not comprising the first message; either of the second signaling and the third signaling is received. Herein, the first message is used to determine whether there is an RLF-related message.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives a first signaling; and transmits a second signaling; herein, the first signaling is used for radio resource control reconfiguration; the second signaling is used for an acknowledgement of the radio resource control reconfiguration; the first signaling is associated with a first identity, the first identity is related to an initiator of the first signaling, and the first identity is used to determine a receiver of the second signaling; the initiator of the first signaling includes a first network device or a second network device, and the first node is in connection with both the first network device and the second network device, the first network device being associated with a first-type node and the second network device being associated with a second-type node; the first-type node is different from the second-type node.

In one embodiment, the first communication device 450 comprises a memory that stores a computer readable instruction program. The computer readable instruction program generates actions when executed by at least one processor. The actions include: receiving a first signaling; and transmitting a second signaling; herein, the first signaling is used for radio resource control reconfiguration; the second signaling is used for an acknowledgement of the radio resource control reconfiguration; the first signaling is associated with a first identity, the first identity is related to an initiator of the first signaling, and the first identity is used to determine a receiver of the second signaling; the initiator of the first signaling includes a first network device or a second network device, and the first node is in connection with both the first network device and the second network device, the first network device being associated with a first-type node and the second network device being associated with a second-type node; the first-type node is different from the second-type node.

In one embodiment, the second communication device 410 comprises at least one processor and at least one memory. The at least one memory comprises computer program codes. The at least one memory and the computer program codes are configured to be used in collaboration with the at least one processor. The second communication device 410 at least transmits a first signaling; and receives a second signaling; herein, the first signaling is used for radio resource control reconfiguration; the second signaling is used for an acknowledgement of the radio resource control reconfiguration; the first signaling is associated with a first identity, the first identity is related to an initiator of the first signaling, and the first identity is used to determine a receiver of the second signaling; a receiver of the first signaling is in connection with a first network device and a second network device simultaneously, the network device is either the first network device or the second network device, and the initiator of the first signaling includes the first network device or the second network device, the first network device being associated with a first-type node and the second network device being associated with a second-type node; the first-type node is different from the second-type node.

In one embodiment, the second communication device 410 comprises a memory that stores a computer readable instruction program. The computer readable instruction program generates actions when executed by at least one processor. The actions include: transmitting a first signaling; and receiving a second signaling; herein, the first signaling is used for radio resource control reconfiguration; the second signaling is used for an acknowledgement of the radio resource control reconfiguration; the first signaling is associated with a first identity, the first identity is related to an initiator of the first signaling, and the first identity is used to determine a receiver of the second signaling; a receiver of the first signaling is in connection with a first network device and a second network device simultaneously, the network device is either the first network device or the second network device, and the initiator of the first signaling includes the first network device or the second network device, the first network device being associated with a first-type node and the second network device being associated with a second-type node; the first-type node is different from the second-type node.

In one embodiment, the antenna 452, the receiver 454, the receiving processor 456, the controller/processor 459 are used to receive a first signaling; at least one of the antenna 420, the transmitter 418, the transmitting processor 416 or the controller/processor 475 is used to transmit the first signaling.

In one embodiment, the antenna 452, the transmitter 454, the transmitting processor 468 and the controller/processor 459 are used to transmit a third signaling; at least one of the antenna 420, the receiver 418, the receiving processor 470 or the controller/processor 475 is used to receive the third signaling.

In one embodiment, the antenna 452, the receiver 454, the receiving processor 456, the controller/processor 459 are used to receive a fifth signaling; at least one of the antenna 420, the transmitter 418, the transmitting processor 416 or the controller/processor 475 is used to transmit the fifth signaling.

In one embodiment, the antenna 452, the transmitter 454, the transmitting processor 468 and the controller/processor 459 are used to transmit a second signaling and a fourth signaling; at least one of the antenna 420, the receiver 418, the receiving processor 470 or the controller/processor 475 is used to receive the second signaling and the fourth signaling.

In one embodiment, the antenna 452, the receiver 454, the receiving processor 456, the controller/processor 459 are used to receive a second message; at least one of the antenna 420, the transmitter 418, the transmitting processor 416 or the controller/processor 475 is used to transmit the second message.

In one embodiment, the antenna 452, the transmitter 454, the transmitting processor 468 and the controller/processor 459 are used to transmit a third information set; at least one of the antenna 420, the receiver 418, the receiving processor 470 or the controller/processor 475 is used to receive the third information set.

In one embodiment, the antenna 452, the transmitter 454, the transmitting processor 468 and the controller/processor 459 are used to transmit a second signaling; at least one of the antenna 420, the receiver 418, the receiving processor 470 or the controller/processor 475 is used to receive the second signaling.

In one embodiment, the antenna 452, the receiver 454, the receiving processor 456, the controller/processor 459 are used to receive a third signaling; at least one of the antenna 420, the transmitter 418, the transmitting processor 416 or the controller/processor 475 is used to transmit the third signaling.

In one embodiment, the antenna 452, the receiver 454, the receiving processor 456, the controller/processor 459 are used to receive a fourth signaling; at least one of the antenna 420, the transmitter 418, the transmitting processor 416 or the controller/processor 475 is used to transmit the fourth signaling.

In one embodiment, the antenna 452, the transmitter 454, the transmitting processor 468 and the controller/processor 459 are used to transmit a fifth signaling; at least one of the antenna 420, the receiver 418, the receiving processor 470 or the controller/processor 475 is used to receive the fifth signaling.

In one embodiment, the first communication device 450 corresponds to the first node in the present disclosure.

In one embodiment, the second communication device 410 corresponds to the second node in the present disclosure.

In one embodiment, the second communication device 410 corresponds to the third node in the present disclosure.

In one embodiment, the second communication device 410 corresponds to the fourth node in the present disclosure.

In one embodiment, the first communication device 450 is a UE.

In one embodiment, the first communication device 450 is a UE supporting Dual Connectivity.

In one embodiment, the first communication device 450 is a UE supporting large delay different.

In one embodiment, the first communication device 450 is an NTN-supporting UE.

In one embodiment, the first communication device 450 is a TN-supporting UE.

In one embodiment, the second communication device 410 is a base station (gNB/eNB/ng-eNB).

In one embodiment, the second communication device 410 is a base station supporting large delay difference.

In one embodiment, the second communication device 410 is an NTN-supporting base station.

In one embodiment, the second communication device 410 is a TN-supporting base station.

In one embodiment, the first communication device 450 corresponds to the first node in the present disclosure.

In one embodiment, the second communication device 410 corresponds to the network device in the present disclosure.

In one embodiment, the second communication device 410 corresponds to the first network device in the present disclosure.

In one embodiment, the second communication device 410 corresponds to the second network device in the present disclosure.

In one embodiment, the first communication device 450 is a UE.

In one embodiment, the first communication device 450 is a UE supporting Dual Connectivity.

In one embodiment, the first communication device 450 is an NTN-supporting UE.

In one embodiment, the first communication device 450 is a TN-supporting UE.

In one embodiment, the second communication device 410 is a base station (gNB/eNB/ng-eNB).

In one embodiment, the second communication device 410 is a base station supporting Dual Connectivity.

In one embodiment, the second communication device 410 is an NTN-supporting base station.

In one embodiment, the second communication device 410 is a TN-supporting base station.

Embodiment 5A

Figures 5A, 5B:
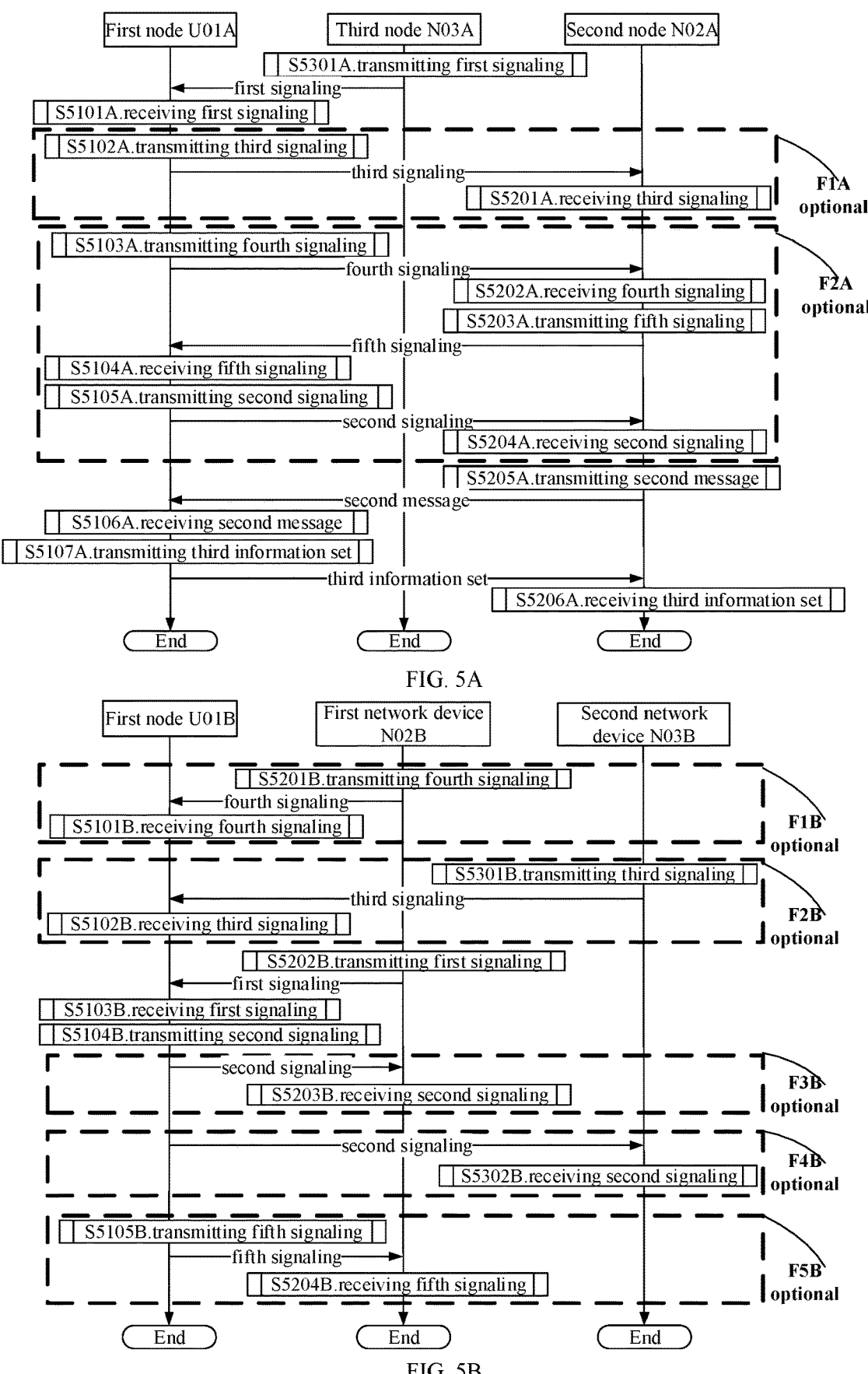
FIG. 5A illustrates a flowchart of radio signal transmission according to one embodiment of the present disclosure.
FIG. 5B illustrates a flowchart of radio signal transmission according to one embodiment of the present disclosure.

Embodiment 5A illustrates a flowchart of radio signal transmission according to one embodiment of the present disclosure, as shown in FIG. 5A. A second node N02A is a maintenance base station for a cell determined by a first node U01A through Cell Selection; a third node N03A is a maintenance base station for a source cell of the first node U01A; it should be particularly noted that the order in this embodiment sets no restriction over the order of signal transmissions and implementations of the present disclosure.

The first node U01A receives a first signaling in step S5101A, transmits a third signaling in step S5102A, and transmits a fourth signaling in step S5103A, receives a fifth signaling in step S5104A, receives a second signaling in step S5105A, receives a second message in step S5106A, and transmits a third information set in step S5107A.

The second node N02A receives a third signaling in step S5201A, receives a fourth signaling in step S5202A, and transmits a fifth signaling in step S5203A, and receives a second signaling in step S5204A, transmits a second message in step S5205A, and receives a third information set in step S5206A.

The third node N03A transmits a first signaling in step S5301A.

In Embodiment 5A, the first signaling indicates a first candidate cell set; a radio connection failure is determined; and generates the RLF-related message as a response to the determined radio connection failure; and chooses a first target cell as a response to the determined radio connection failure; a second signaling is transmitted when the first target cell does not belong to the first candidate cell set, the second signaling comprising a first message; or a third signaling is transmitted when the first target cell is a candidate cell in the first candidate cell set, the third signaling not comprising the first message; and clears the RLF-related message; the first target cell is a candidate cell in the first candidate cell set; either of the second signaling and the third signaling is transmitted; the first message is used to determine whether there is the RLF-related message; the fifth signaling is used to trigger the second signaling; the second message is used to trigger transmission of the third information set, the third information set comprising a first sub-information-block, the first sub-information-block comprising the RLF-related message; the first target cell does not belong to the first candidate cell set.

In one embodiment, the second node N02A is a maintenance base station for the first target cell.

In one embodiment, the second node N02A is a maintenance base station for a CHO candidate cell.

In one embodiment, the second node N02A is not a maintenance base station for a CHO candidate cell.

In one embodiment, the third node N03A is a maintenance base station for a cell where the RLF-related failure occurs.

In one embodiment, the third node N03A is a maintenance base station for a cell for which the CHO is configured.

In one embodiment, the first receiver generates the RLF-related message.

In one embodiment, the first node U01A generates the RLF-related message.

In one embodiment, the phrase that "generates the RLF-related message as a response to the determined radio connection failure" comprises the meaning that generates the RLF-related message after the radio connection failure is determined.

In one embodiment, the phrase that "generates the RLF-related message as a response to the determined radio connection failure" comprises the meaning that generates the RLF-related message when the radio connection failure occurs.

In one embodiment, the phrase that "generates the RLF-related message as a response to the determined radio connection failure" comprises the meaning that generates the RLF-related message when the first node U01A declares the radio connection failure.

In one embodiment, the generating includes storing.

In one embodiment, the generating includes saving.

In one embodiment, the generating includes setting.

In one embodiment, the generating includes logging.

In one embodiment, the phrase that generates the RLF-related message means setting a field in the VarRLF-Report as information related to the radio connection failure.

In one embodiment, the phrase that generates the RLF-related message means storing the RLF-related message in the VarRLF-Report.

In one embodiment, the first receiver clears the RLF-related message.

In one embodiment, the first node U01A clears the RLF-related message.

In one embodiment, the phrase that "clears the RLF-related message; the first target cell is a candidate cell in the first candidate cell set" comprises the meaning that clears the RLF-related message as a response to choosing the first target cell.

In one embodiment, the phrase that "clears the RLF-related message; the first target cell is a candidate cell in the first candidate cell set" comprises the meaning that clears the RLF-related message when the cell chosen is a CHO candidate cell.

In one embodiment, the phrase that "clears the RLF-related message; the first target cell is a candidate cell in the first candidate cell set" comprises the meaning that clears the RLF-related message generated as a response to the fact that the first target cell is a candidate cell in the first candidate cell set.

In one embodiment, the phrase that "clears the RLF-related message; the first target cell is a candidate cell in the first candidate cell set" comprises the meaning that when the first target cell is a candidate cell in the first candidate cell set, and the first node U01A recovers the radio link through the first target cell, clears the RLF-related message.

In one embodiment, as a response to the phrase of transmitting a third signaling, clears the RLF-related message.

In one embodiment, the word "clear" includes the meaning of deleting.

In one embodiment, the word "clear" includes the meaning of discarding.

In one embodiment, the word "clear" includes the meaning of releasing.

In one embodiment, the phrase that clears the RLF-related message includes clearing the RLF-related message stored in the VarRLF-Report.

In one embodiment, the fourth signaling is transmitted via an air interface.

In one embodiment, the fourth signaling is transmitted via a wireless interface.

In one embodiment, the fourth signaling is transmitted via a higher layer signaling.

In one embodiment, the fourth signaling comprises a higher layer signaling.

In one embodiment, the fourth signaling comprises all or part of a higher layer signaling.

In one embodiment, the fourth signaling comprises an RRC Message.

In one embodiment, the fourth signaling comprises all or part of IEs in an RRC Message.

In one embodiment, the fourth signaling comprises all or part of fields of an IE in an RRC Message.

In one embodiment, a signaling radio bearer bearing the fourth signaling includes SignallingRadio Bearer 0 (SRB0).

In one embodiment, a logical channel bearing the fourth signaling comprises a Common Control Channel (CCCH).

In one embodiment, the fourth signaling is used to initiate an RRC Reestablishment request.

In one embodiment, the fourth signaling comprises a RRCReestablishmentRequest message.

In one embodiment, the fourth signaling comprises a RRCConnectionReestablishmentRequest message.

In one embodiment, the fourth signaling is used to trigger the fifth signaling.

In one embodiment, the fifth signaling is transmitted via an air interface.

In one embodiment, the fifth signaling is transmitted via a wireless interface.

In one embodiment, the fifth signaling is transmitted via a higher layer signaling.

In one embodiment, the fifth signaling comprises a higher layer signaling.

In one embodiment, the fifth signaling comprises all or part of a higher layer signaling.

In one embodiment, the fifth signaling comprises an RRC Message.

In one embodiment, the fifth signaling comprises all or part of IEs in an RRC Message.

In one embodiment, the fifth signaling comprises all or part of fields of an IE in an RRC Message.

In one embodiment, a signaling radio bearer bearing the fifth signaling includes an SRB0.

In one embodiment, a signaling radio bearer bearing the fifth signaling includes a Signalling Radio Bearer 1 (SRB1).

In one embodiment, a logical channel bearing the fifth signaling comprises a DCCH.

In one embodiment, a logical channel bearing the fifth signaling comprises a CCCH.

In one embodiment, the fifth signaling is used for SRB1 reestablishment.

In one embodiment, the fifth signaling comprises a RRCReestablishment message.

In one embodiment, the fifth signaling comprises a RRC-ConnectionReestablishment message.

In one embodiment, the phrase that the fifth signaling is used to trigger the second signaling comprises the meaning that after receiving the fifth signaling, the first node U01A transmits the second signaling.

In one embodiment, the phrase that the fifth signaling is used to trigger the second signaling comprises the meaning that after the RRC Reestablishment performed according to the fifth signaling by the first node U01A is completed with success, the first node U01A transmits the second signaling.

In one embodiment, the second signaling comprises a RRCConnectionReestablishmentComplete message.

In one embodiment, the second signaling comprises a RRCReestablishmentComplete message.

In one embodiment, the transmitter of the second message is the same as the transmitter of the first signaling.

In one embodiment, the transmitter of the second message is the same as the receiver of the second signaling.

In one embodiment, the transmitter of the second message is the same as the receiver of the third signaling.

In one embodiment, the transmitter of the second message is different from any of the transmitter of the first signaling, the receiver of the second signaling and the receiver of the third signaling.

In one embodiment, the transmitter of the second message includes a maintenance base station for the first target cell.

In one embodiment, the transmitter of the second message includes a maintenance base station for the first serving cell.

In one embodiment, the transmitter of the second message includes a maintenance base station for a serving cell in connection with the first node U01A.

In one subembodiment, the serving cell in connection with the first node U01A is different from the first target cell.

In one subembodiment, the serving cell in connection with the first node U01A is the same as the first target cell.

In one subembodiment, the serving cell in connection with the first node U01A is different from the first serving cell.

In one subembodiment, the serving cell in connection with the first node U01A is the same as the first serving cell.

In one embodiment, the second message is transmitted via an air interface.

In one embodiment, the second message is transmitted via a wireless interface.

In one embodiment, the second message is transmitted via a higher layer signaling.

In one embodiment, the second message comprises a higher layer signaling.

In one embodiment, the second message comprises all or part of a higher layer signaling.

In one embodiment, the second message comprises an RRC message.

In one embodiment, the second message comprises all or part of IEs in an RRC message.

In one embodiment, the second message comprises all or part of fields of an IE in an RRC message.

In one embodiment, the second message comprises a DL signaling.

In one embodiment, a signaling radio bearer of the second message comprises an SRB1.

In one embodiment, a logical channel bearing the second message comprises a DCCH.

In one embodiment, the second message is used for requesting UEInformation.

In one embodiment, the second message is used for requesting an RLF-related information.

In one embodiment, the second message comprises a UEInformationRequest message.

In one embodiment, the second message comprises a RLF-ReportReq IE.

In one embodiment, the second message comprises a rlf-ReportReq field.

In one embodiment, when the rlf-ReportReq in the second message is set as True, the rlf-ReportReq is used for requesting the RLF-related message.

In one embodiment, when the rlf-ReportReq in the second message is set as False, the rlf-ReportReq is used for not requesting the RLF-related message.

In one embodiment, the phrase that the second message is used to trigger transmission of the third information set comprises the meaning that when receiving the second message, the first node U01A transmits the third information set.

In one embodiment, the phrase that the second message is used to trigger transmission of the third information set comprises the meaning that the first node U01A determines information contained in the third information set according to the second message received.

In one embodiment, the receiver of the third information set is the same as the transmitter of the second message.

In one embodiment, the third information set is transmitted via an air interface.

In one embodiment, the third information set is transmitted via a wireless interface.

In one embodiment, the third information set is transmitted via a higher layer signaling.

In one embodiment, the third information set comprises a higher layer signaling.

In one embodiment, the third information set comprises all or part of a higher layer signaling.

In one embodiment, the third information set comprises an RRC message.

In one embodiment, the third information set comprises all or part of IEs in an RRC message.

In one embodiment, the third information set comprises all or part of fields of an IE in an RRC message.

In one embodiment, the third information set comprises an Uplink (UL) message.

In one embodiment, the third information set is used for UEInformationResponse.

In one embodiment, the third information set is used for reporting RLF-related message.

In one embodiment, a signaling radio bearer of the third information set comprises an SRB1.

In one embodiment, a signaling radio bearer of the third information set comprises an SRB2.

In one embodiment, a logical channel bearing the third information set comprises a DCCH.

In one embodiment, the third information set comprises a UEInformationResponse message.

In one embodiment, the third information set comprises a rlf-Report IE, the rlf-Report IE comprising the RLF-related message.

In one embodiment, the phrase of the third information set comprising a first sub-information-block comprises the meaning that the first sub-information-block is one or more IEs in the third information set.

In one embodiment, the phrase of the third information set comprising a first sub-information-block comprises the meaning that the first sub-information-block is one or more fields of an IE in the third information set.

In one embodiment, the first sub-information-block comprises a rlf-Report field.

In one embodiment, the first sub-information-block comprises part of fields of RLF-Report-r9.

In one embodiment, the first sub-information-block comprises part of fields of RLF-Report-r16.

In one embodiment, the first sub-information-block comprises all fields of RLF-Report-r9.

In one embodiment, the first sub-information-block comprises all fields of RLF-Report-r16.

In one embodiment, the phrase that the first sub-information-block comprises the RLF-related message comprises the meaning that the first sub-information-block comprises all of the RLF-related message.

In one embodiment, the phrase that the first sub-information-block comprises the RLF-related message comprises the meaning that the first sub-information-block comprises part of the RLF-related message.

In one embodiment, the first message is used to determine transmission of the second message.

In one embodiment, the first message is used to trigger the second message.

In one embodiment, the receiver of the first message determines a transmission time of the second message according to the first message.

In one embodiment, the receiver of the first message judges a transmission time of the second message according to the first message.

In one embodiment, the transmission time of the second message is autonomously determined by the receiver of the first message.

In one embodiment, the receiver of the first message determines a transmission time of the second message according to the first message and a scheduling result of a scheduler.

In one embodiment, a box F1 framed with broken lines is optional.

In one embodiment, a box F2 framed with broken lines is optional.

In one embodiment, the box F1 framed with broken lines exists, while the box F2 framed with broken lines does not exist.

In one embodiment, the box F1 framed with broken lines does not exist, while the box F2 framed with broken lines exists.

Embodiment 5B

Embodiment 5B illustrates a flowchart of radio signal transmission according to one embodiment of the present disclosure, as shown in FIG. 5B. A first node U01B is a UE; a first network N02B and a second network N03B are two base stations; it should be particularly noted that the order illustrated herein does not set any restrictions on the sequential order of signal transmissions and implementations in the present disclosure.

The first node U01B receives a fourth signaling in step S5101B, receives a third signaling in step S5102B, and receives a first signaling in step S5103B, transmits a second signaling in step S5104B, and transmits a fifth signaling in step S5105B.

The first network N02B transmits a fourth signaling in step S5201B, transmits a first signaling in step S5202B, receives a second signaling in step S5203B, and receives a fifth signaling in step S5204B.

The second network N03B transmits a third signaling in step S5301B, and receives a second signaling in step S5302B.

In Embodiment 5B, the first signaling is used for radio resource control reconfiguration; the second signaling is used for an acknowledgement of the radio resource control reconfiguration; the first signaling is associated with a first identity, the first identity is related to an initiator of the first signaling, and the first identity is used to determine a receiver of the second signaling; the initiator of the first signaling includes a first network device N02B or a second network device N03B, and the first node U01B is in connection with both the first network device N02B and the second network device N03B, the first network device N02B being associated with a first-type node and the second network device N03B being associated with a second-type node; the first-type node is different from the second-type node; the first signaling is used to determine a first parameter set, the first parameter set comprises a first condition and a first candidate cell, and the first parameter set is associated with a second identity; the first condition is used to determine whether the first candidate cell is changed to a first target cell, the target cell being a Primary Cell (PCell) in a first cell group, and the first cell group being associated with either the first-type node or the second-type node; the second identity is related to the initiator of the first signaling, or the second identity is related to the first target cell; the third signaling is used to determine a second parameter set, the second parameter set comprises a second condition and the first candidate cell, and the second parameter set is associated with the second identity; the second condition is used to determine whether the first candidate cell is changed to a first target cell; an initiator of the first signaling is different from that of the third signaling; when the first condition conflicts with the second condition, the first node U01B selects one of the first condition and the second condition to determine whether to change the first candidate cell to the first target cell; the fourth signaling is used to determine priority of the first condition or the second condition; the fifth signaling is used to indicate that the first candidate cell is changed to the first target cell; a receiver of the fifth signaling is the first network device N02B, or the receiver of the fifth signaling is the second network device N03B.

In one embodiment, the first signaling is used for configurations for Conditional Handover (CHO).

In one embodiment, the first signaling is used for configurations for Conditional PSCell Addition/Change (CPAC).

In one embodiment, the first signaling is used for configurations for Conditional PSCell Change (CPC).

In one embodiment, the first signaling is used for configurations for Conditional PSCell Addition (CPA).

In one embodiment, the first signaling is used for configurations for Conditional PCell Handover, the PCell Handover being performed based on CHO.

In one embodiment, the phrase that the first signaling is used to determine a first parameter set comprises the meaning that the first signaling comprises the first parameter set.

In one embodiment, the phrase that the first signaling is used to determine a first parameter set comprises the meaning that the first parameter set is one or more IEs in the first signaling.

In one embodiment, the phrase that the first signaling is used to determine a first parameter set comprises the meaning that the first parameter set is one or more fields of an IE in the first signaling.

In one embodiment, the phrase that the first parameter set comprises a first condition and a first candidate cell comprises the meaning that the first parameter set comprises the first condition.

In one embodiment, the phrase that the first parameter set comprises a first condition and a first candidate cell comprises the meaning that the first parameter set comprises the first candidate cell.

In one embodiment, the phrase that the first parameter set comprises a first condition and a first candidate cell comprises the meaning that the first parameter set comprises a first condition and a first candidate cell, with the first condition being specific to the first candidate cell.

In one embodiment, the phrase that the first parameter set is associated with a second identity comprises the meaning that the first parameter set identifies by the second identity.

In one embodiment, the phrase that the first parameter set is associated with a second identity comprises the meaning that the second identity is used to determine the first parameter set.

In one embodiment, the phrase that the first parameter set is associated with a second identity comprises the meaning that the first parameter set comprises the second identity.

In one embodiment, the first identity and the second identity are the same.

In one embodiment, the first identity and the second identity are different.

In one embodiment, the second identity is a variant.

In one embodiment, the second identity is used to determine a cell group.

In one subembodiment, when the second identity is equal to a first value, the first parameter set is associated with an MCG.

In one subembodiment, when the second identity is equal to a second value, the first parameter set is associated with an SCG.

In one embodiment, the second identity is used to determine a Special Cell (SPCell).

In one subembodiment, when the second identity is equal to a first value, the first parameter set is associated with a PCell.

In one subembodiment, when the second identity is equal to a second value, the first parameter set is associated with a PSCell.

In one subembodiment, when the second identity is equal to a first value, the first condition is used to determine whether to change the first candidate cell to a PCell.

In one subembodiment, when the second identity is equal to a second value, the first condition is used to determine whether to change the first candidate cell to a PSCell.

In one subembodiment, when the second identity is equal to a third value, the first condition is used to determine whether to change the first candidate cell to a PSCell of another SCG.

In one embodiment, the second identity is used to determine a node.

In one subembodiment, when the second identity is equal to a first value, the first parameter set is associated with a master node (MN).

In one subembodiment, when the second identity is equal to a second value, the first parameter set is associated with a secondary node (SN).

In one subembodiment, when the second identity is equal to a first value, the second identity is used to indicate that the CPAC is initiated by the first network device N02B.

In one subembodiment, when the second identity is equal to a second value, the second identity is used to indicate that the CPAC is initiated by the second network device N03B.

In one embodiment, the second identity is used to determine a cell associated with the first parameter set.

In one embodiment, the second identity is used to determine a cell group to which a cell associated with the first parameter set belongs.

In one embodiment, the second identity is used to determine that the first parameter set is associated with an MN.

In one embodiment, the second identity is used to determine that the first parameter set is associated with an SN.

In one embodiment, the second identity is used to determine that the first parameter set is associated with an SPCell.

In one embodiment, the second identity is used to determine that the first parameter set is associated with a PSCell.

In one embodiment, the second identity is used to determine that the first parameter set is associated with a PCell.

In one embodiment, the second identity is used to determine that the first parameter set is used for the CPAC.

In one embodiment, the second identity is used to determine that the first parameter set is used for the PCell CHO.

In one embodiment, the second identity is used to determine that the first parameter set is used for determining whether the network configures the CHO or the CPAC for the first node U01B.

In one embodiment, the second identity is used to determine whether the transmitter of the first signaling is the first network device N02B or the second network device N03B.

In one embodiment, the second identity is used to determine whether the receiver of the second signaling is the first network device N02B or the second network device N03B.

In one embodiment, the second identity is used to determine a cell associated with the first parameter set.

In one embodiment, the second identity is used to determine that the first parameter set is related to Primary Cell Change in the first-type node, or the first parameter set is related to Primary Cell Change in the second-type node.

In one subembodiment, the Primary Cell in the first-type node is a PCell.

In one subembodiment, the Primary Cell in the second-type node is a PSCell.

In one subembodiment, when the second identity is equal to a first value, the first parameter set is used for Primary Cell Change in the first-type node, when the second identity is equal to a second value, the first parameter set is used for Primary Cell Change in the second-type node.

In one subembodiment, the phrase that the first parameter set is related to Primary Cell Change in the first-type node comprises the meaning that the first parameter set is used for the Primary Cell Change in the first-type node.

In one subembodiment, the phrase that the first parameter set is related to Primary Cell Change in the first-type node comprises the meaning that the first parameter set is used for the Primary Cell Change in the second-type node.

In one embodiment, the second identity is used to indicate that the first parameter set is used for handover of a Primary Cell (PCell), or for change of a Primary SCG Cell (PSCell); the PCell is associated with a Master Cell Group (MCG), and the MCG is associated with a Master Node (MN); the PSCell is associated with a Secondary Cell Group (SCG), and the SCG is associated with a Secondary Node (SN).

In one embodiment, the second identity is used to indicate that the first parameter set is used for change of a PSCell initiated by the MN, or for change of a PSCell initiated by the SN.

In one embodiment, the second identity comprises a first sub-identity and a second sub-identity; the first sub-identity is used to determine that the first parameter set is used for PCell handover or PSCell change; the second sub-identity is used to determine whether the initiator of the first signaling is the first network node or the second network node.

In one embodiment, the first network device N02B is associated with the first-type node.

In one embodiment, the first-type node is an MN.

In one embodiment, the second network device N03B is associated with the second-type node.

In one embodiment, the second-type node is an SN.

In one embodiment, the first cell group is associated with the first network device N02B.

In one embodiment, the first cell group is associated with the second network device N03B.

In one embodiment, the first cell group is associated with the first-type node.

In one embodiment, the first cell group is associated with the second-type node.

In one embodiment, the first cell group is associated with an MN.

In one embodiment, the first cell group is associated with an SN.

In one embodiment, the first cell group is an MCG.

In one subembodiment, the MCG comprises one PCell.

In one subsidiary embodiment of the above subembodiment, the PCell is a cell in the MCG that is used for initiating an initial access.

In one subembodiment, the MCG comprises K1 Secondary Cell(s) (SCell(s)), K1 being a non-negative integer.

In one embodiment, the first cell group is a Secondary Cell Group (SCG).

In one subembodiment, the SCG comprises one Primary SCG Cell (PSCell).

In one subsidiary embodiment of the above subembodiment, the PSCell is a cell in the SCG that is used for initiating an initial access.

In one subembodiment, the MCG comprises K2 SCell(s), K2 being a non-negative integer.

In one embodiment, the first candidate cell is a cell in an SCG.

In one embodiment, the first candidate cell is a cell in an MCG.

In one embodiment, the first candidate cell is a cell determined by the first node U01B through measurement.

In one embodiment, the first candidate cell is a cell that fulfills a second condition, and the second condition is determined by the second network device N03B or the third network, the second condition being different from the first condition.

In one embodiment, the first target cell is a Special Cell (SPCell), the SPCell being a major cell in the MCG or the SCG.

In one embodiment, the first target cell is a PCell.

In one embodiment, the first target cell is a PSCell.

In one embodiment, the phrase that the first condition is used to determine whether the first candidate cell is changed to a first target cell comprises the meaning that when the first condition is fulfilled, the first node U01 decides to change the first candidate cell to the first target cell.

In one embodiment, the phrase that the first condition is used to determine whether the first candidate cell is changed to a first target cell comprises the meaning that when the first condition is unfulfilled, the first node U01 does not change the first candidate cell to the first target cell.

In one embodiment, the phrase that the first target cell is a PCell in a first cell group comprises the meaning that the first target cell is an SPCell in the first cell group.

In one embodiment, the phrase that the first target cell is a PCell in a first cell group comprises the meaning that when the first cell group is an MCG, the first target cell is a PCell.

In one embodiment, the phrase that the first target cell is a PCell in a first cell group comprises the meaning that when the first cell group is an SCG, the first target cell is a PSCell.

In one embodiment, the phrase that the first cell group is associated with the first-type node or the second-type node comprises the meaning that the first cell group is associated with an MN or an SN.

In one embodiment, the phrase that the first cell group is associated with the first-type node or the second-type node comprises the meaning that the first cell group is a group of cells of an MN, or the first cell group is a group of cells of an SN.

In one subembodiment, when the first cell group is an MCG, the first cell group is associated with an MN.

In one subembodiment, when the first cell group is an SCG, the first cell group is associated with an SN.

In one embodiment, the phrase that the first identity is related to the initiator of the first signaling, or the first identity is related to the first target cell comprises the meaning that the first identity is related to the initiator of the first signaling but is unrelated to the first target cell.

In one embodiment, the phrase that the first identity is related to the initiator of the first signaling, or the first identity is related to the first target cell comprises the meaning that the first identity is related to the first target cell but is unrelated to the initiator of the first signaling.

In one embodiment, the phrase that the first identity is related to the initiator of the first signaling, or the first identity is related to the first target cell comprises the meaning that the first identity is not only related to the initiator of the first signaling but also related to the first target cell.

In one embodiment, the transmitter of the third signaling includes the first network device N02B.

In one embodiment, the transmitter of the third signaling includes the second network device N03B.

In one embodiment, the third signaling is a dynamic signaling.

In one embodiment, the third signaling is transmitted via an air interface.

In one embodiment, the third signaling is transmitted via a wireless interface.

In one embodiment, the third signaling is transmitted via a higher layer signaling.

In one embodiment, the third signaling is transmitted via a Uu interface.

In one embodiment, the third signaling is transmitted in DownLink.

In one embodiment, the third signaling is cell-specific.

In one embodiment, the third signaling is UE-specific.

In one embodiment, the third signaling comprises a layer 3 (L3) signaling.

In one embodiment, the third signaling comprises all or part of a higher layer signaling.

In one embodiment, the third signaling comprises an RRC message.

In one embodiment, the third signaling comprises all or part of IEs in an RRC signaling.

In one embodiment, the third signaling comprises all or part of fields of an IE in an RRC signaling.

In one embodiment, a logical channel bearing the third signaling comprises a DCCH.

In one embodiment, a signaling radio bearer of the third signaling comprises an SRB1.

In one embodiment, a signaling radio bearer of the third signaling comprises an SRB3.

In one embodiment, the third signaling comprises a RRCReconfiguration message.

In one embodiment, the third signaling comprises a RRCReestablishment message.

In one embodiment, the phrase that the third signaling is used to determine a second parameter set comprises the meaning that the third signaling comprises the second parameter set.

In one embodiment, the phrase that the third signaling is used to determine a second parameter set comprises the meaning that the second parameter set is one or more IEs in the third signaling.

In one embodiment, the phrase that the third signaling is used to determine a second parameter set comprises the meaning that the second parameter set is one or more fields of an IE in the third signaling.

In one embodiment, the phrase that the second parameter set comprises a second condition and the first candidate cell comprises the meaning that the second parameter set comprises the second condition.

In one embodiment, the phrase that the second parameter set comprises a second condition and the first candidate cell comprises the meaning that the second parameter set comprises the first candidate cell.

In one embodiment, the phrase that the second parameter set comprises a second condition and the first candidate cell comprises the meaning that the second parameter set comprises a second condition and the first candidate cell, with the second condition being specific to the first candidate cell.

In one embodiment, the phrase that the second parameter set is associated with a second identity comprises the meaning that the second parameter set identifies by the second identity.

In one embodiment, the phrase that the second parameter set is associated with a second identity comprises the meaning that the second identity is used to determine the second parameter set.

In one embodiment, the phrase that the second parameter set is associated with a second identity comprises the meaning that the second parameter set comprises the second identity.

In one embodiment, the phrase that the second condition is used to determine whether to change the first candidate cell to a first target cell comprises the meaning that when the second condition is fulfilled, the first node U01B decides to change the first candidate cell to the first target cell.

In one embodiment, the phrase that the second condition is used to determine whether to change the first candidate cell to a first target cell comprises the meaning that when the second condition is unfulfilled, the first node U01B does not change the first candidate cell to the first target cell.

In one embodiment, the phrase that an initiator of the first signaling is different from that of the third signaling comprises the meaning that the initiator of the first signaling is the first network device N02B, and the initiator of the second signaling is the second network device N03B.

In one embodiment, the phrase that an initiator of the first signaling is different from that of the third signaling comprises the meaning that the initiator of the first signaling is the second network device N03B, and the initiator of the second signaling is the first network device N02B.

In one embodiment, the phrase that the first condition conflicts with the second condition means that the first condition and the second condition have different reference quantities.

In one subembodiment, the reference quantity comprises a Measurement Quantity, the Measurement Quantity comprising one of a Reference signal received power (RSRP), a Reference signal received quality (RSRQ), a Received signal strength indicator (RSSI) or a Signal to Noise and Interference Ratio (SINR).

In one subembodiment, the first condition comprises a combination of multiple measurement quantities.

In one subembodiment, the reference quantity comprises Satellite Ephemeris.

In one subembodiment, the reference quantity comprises a UE Location of the first node U01B.

In one subembodiment, the reference quantity comprises Time.

In one embodiment, the phrase that the first condition conflicts with the second condition means that the first condition and the second condition have a same reference quantity but with different thresholds, the thresholds being configurable.

In one embodiment, the phrase that the first node U01B selects one of the first condition and the second condition to determine whether to change the first candidate cell to the first target cell comprises the meaning that the first node U01B determines whether to change the first candidate cell to the first target cell according to the first condition.

In one embodiment, the phrase that the first node U01B selects one of the first condition and the second condition to determine whether to change the first candidate cell to the first target cell comprises the meaning that the first node U01B determines whether to change the first candidate cell to the first target cell according to the second condition.

In one embodiment, the transmitter of the fourth signaling comprises the first network device N02B.

In one embodiment, the transmitter of the fourth signaling comprises the second network device N03B.

In one embodiment, the fourth signaling is a dynamic signaling.

In one embodiment, the fourth signaling is transmitted via an air interface.

In one embodiment, the fourth signaling is transmitted via a wireless interface.

In one embodiment, the fourth signaling is transmitted via a higher layer signaling.

In one embodiment, the fourth signaling is transmitted via a Uu interface.

In one embodiment, the fourth signaling is transmitted in DownLink.

In one embodiment, the fourth signaling is cell-specific.

In one embodiment, the fourth signaling is UE-specific.

In one embodiment, the fourth signaling comprises a L3 signaling.

In one embodiment, the fourth signaling comprises all or part of a higher layer signaling.

In one embodiment, the fourth signaling comprises an RRC message.

In one embodiment, the fourth signaling comprises all or part of IEs in an RRC signaling.

In one embodiment, the fourth signaling comprises all or part of fields of an IE in an RRC signaling.

In one embodiment, the fourth signaling is used to indicate that the first condition is employed by the first node U01B prior to the second condition.

In one subembodiment, the first node U01B selects the first condition from the first condition and the second condition to determine whether to change the first candidate cell to a first target cell.

In one embodiment, the fourth signaling is used to indicate that the second condition is employed by the first node U01B prior to the first node.

In one subembodiment, the first node U01B selects the second condition from the first condition and the second condition to determine whether to change the first candidate cell to a first target cell.

In one embodiment, the fourth signaling is used to indicate priority of the first condition.

In one embodiment, the fourth signaling is used to indicate priority of the second condition.

In one embodiment, the priority is related to the initiator of the first signaling.

In one subembodiment, the priority of the initiator of the first signaling being an MN is higher than the priority of the initiator of the first signaling being an SN.

In one embodiment, the priority is related to a signaling radio bearer of the first signaling.

In one subembodiment, the priority of the signaling radio bearer being an SRB1 is higher than the priority of the signaling radio bearer being an SRB3.

In one embodiment, the priority is related to a first target cell.

In one subembodiment, the priority of the first target cell being a PCell is higher than the priority of the first target cell being a PSCell.

In one embodiment, the receiver of the fifth signaling includes the first network device N02B.

In one embodiment, the receiver of the fifth signaling includes the second network device N03B.

In one embodiment, when the first target cell is a PCell, the receiver of the fifth signaling is an SN.

In one embodiment, when the first target cell is a PSCell, the receiver of the fifth signaling is an MN.

In one embodiment, the fifth signaling is transmitted via an air interface.

In one embodiment, the fifth signaling is transmitted via a wireless interface.

In one embodiment, the fifth signaling is transmitted via a higher layer signaling.

In one embodiment, the fifth signaling is transmitted via a Uu interface.

In one embodiment, the fifth signaling is transmitted in UL.

In one embodiment, the fifth signaling comprises a L3 signaling.

In one embodiment, the fifth signaling comprises all or part of a higher layer signaling.

In one embodiment, the fifth signaling comprises an RRC message.

In one embodiment, the fifth signaling comprises all or part of IEs in an RRC signaling.

In one embodiment, the fifth signaling comprises all or part of fields of an IE in an RRC signaling.

In one embodiment, the phrase that the fifth signaling is used to indicate that the first candidate cell is changed to the first target cell means that the fifth signaling comprises an indication that the first candidate cell is changed to the first target cell.

In one embodiment, the phrase that the first candidate cell is changed to the first target cell includes the following meaning: PCell Handover is completed.

In one embodiment, the phrase that the first candidate cell is changed to the first target cell includes the following meaning: PSCell Change is completed.

In one embodiment, the phrase that the first candidate cell is changed to the first target cell includes the following meaning: PSCell Addition is completed.

In one embodiment, when the fifth signaling is transmitted, the second signaling is already transmitted.

In one embodiment, when the fifth signaling is transmitted, the second signaling is not yet transmitted.

In one embodiment, only when the first node U01B determines to change the first candidate cell to the first target cell according to the first condition is the fifth signaling transmitted.

In one embodiment, only when the first node U01B has already changed the first candidate cell to the first target cell according to the first condition is the fifth signaling transmitted.

In one embodiment, the phrase that a receiver of the fifth signaling is the first network device N02B, or the receiver of the fifth signaling is the second network device N03B means that the receiver of the fifth signaling is the first network device N02B.

In one embodiment, the phrase that a receiver of the fifth signaling is the first network device N02B, or the receiver of the fifth signaling is the second network device N03B means that the receiver of the fifth signaling is the second network device N03B.

In one embodiment, a broken-line framed box F1B exists.

In one embodiment, a broken-line framed box F1B does not exist.

In one embodiment, a broken-line framed box F2B exists.

In one embodiment, a broken-line framed box F2B does not exist.

In one embodiment, a broken-line framed box F3B exists, while a broken-line framed box F4B does not exist.

In one embodiment, a broken-line framed box F3B does not exist, while a broken-line framed box F4B exists.

In one embodiment, a broken-line framed box F5B exists.

In one embodiment, a broken-line framed box F5B does not exist.

Embodiment 6A

Figures 6A, 6B:
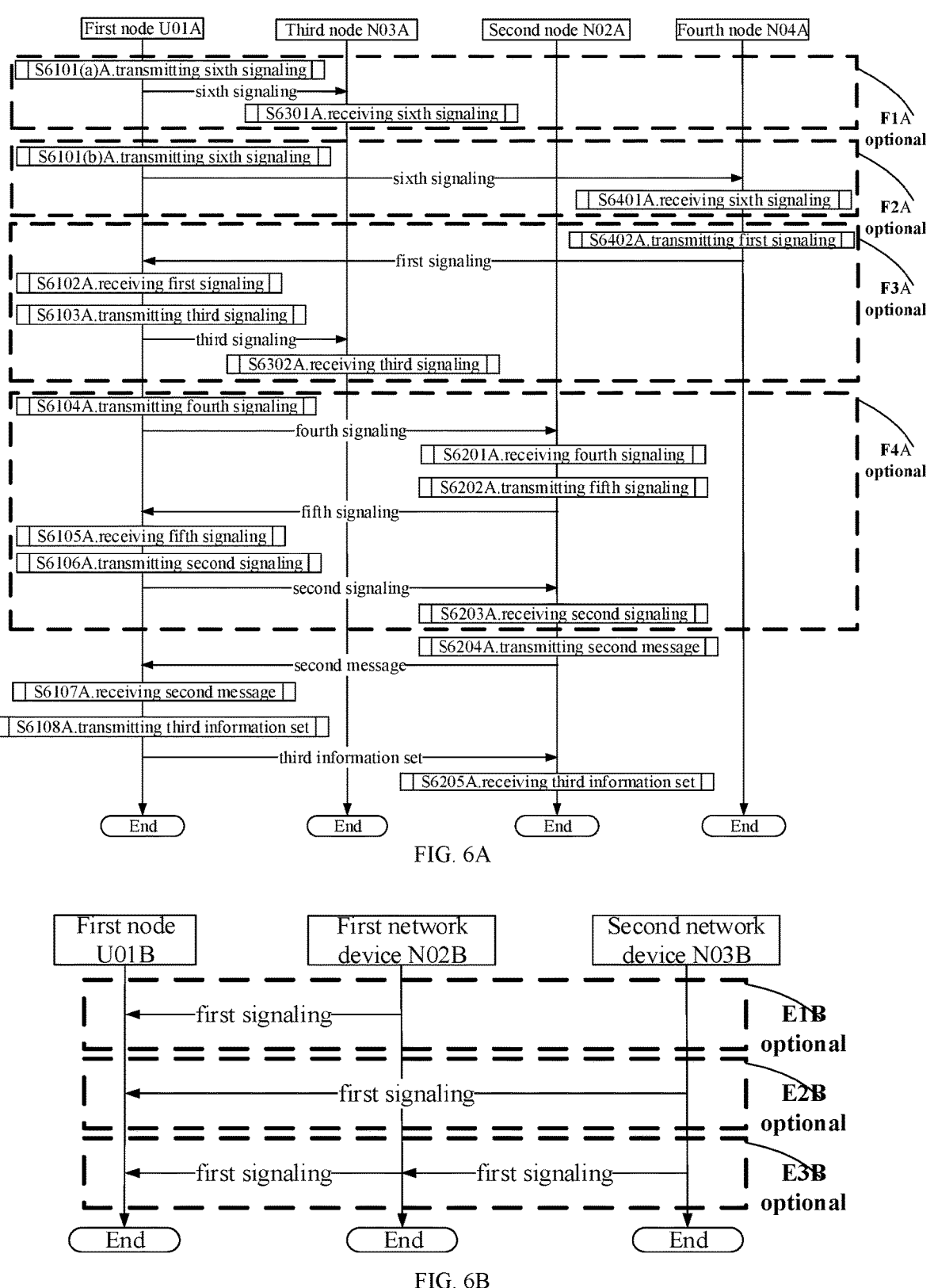
FIG. 6A illustrates a flowchart of radio signal transmission according to another embodiment of the present disclosure.
FIG. 6B illustrates a schematic diagram of an initiator and a transmitter of a first signaling according to one embodiment of the present disclosure.

Embodiment 6A illustrates a flowchart of radio signal transmission according to another embodiment of the present disclosure, as shown in FIG. 6A. a second node N02A is a maintenance base station for a cell determined by a first node U01A through Cell Selection; a third node N03A is a maintenance base station for a source cell of the first node U01A; the fourth node N04A is an SN; it should be particularly noted that the order illustrated herein does not set any restrictions on the sequential order of signal transmissions and implementations in the present disclosure.

The first node U01A transmits a sixth signaling in step S6101($a$)A or in step S6101($b$)A, and receives a first signaling in step S6102A, transmits a third signaling in step S6103, transmits a fourth signaling in step S6104A, receives a fifth signaling in step S6105A, and transmits a second signaling in step S6106A, receives a second message in step S6107A, and transmits a third information set in step S6108A.

The second node N02A receives a fourth signaling in step S6201A, transmits a fifth signaling in step S6202A, and receives a second signaling in step S6203A, transmits a second message in step S6204A, and receives a third information set in step S6205A.

The third node N03A receives a sixth signaling in step S6301A, and receives a third signaling in step S6302A.

The fourth node N04A receives a sixth signaling in step S6401A, and transmits a first signaling in step S6402A.

In Embodiment 6A, a radio connection failure is determined; generates the RLF-related message as a response to the determined radio connection failure; chooses a first target cell as a response to the determined radio connection failure; the sixth signaling is used to indicate the radio connection failure; the first signaling indicates a first candidate cell set; when the first target cell does not belong to the first candidate cell set, the second signaling is transmitted, the second signaling comprising a first message; or when the first target cell is a candidate cell in the first candidate cell set, a third signaling is transmitted, the third signaling not comprising the first message; and clears the RLF-related message; the first target cell is a candidate cell in the first candidate cell set; either of the second signaling and the third signaling is transmitted; the first message is used to determine whether there is the RLF-related message; the fifth signaling is used to trigger the second signaling; the second message is used to trigger transmission of the third information set, the third information set comprising a first sub-information-block, the first sub-information-block comprising the RLF-related message; the first target cell does not belong to the first candidate cell set.

In Embodiment 6A, a first receiver determines a radio connection failure; chooses a first target cell as a response to the determined radio connection failure; receives a first signaling, the first signaling indicating a first candidate cell set; a first transmitter transmits a second signaling when the first target cell does not belong to the first candidate cell set, the second signaling comprising a first message; or transmits a third signaling when the first target cell is a candidate cell in the first candidate cell set, the third signaling not comprising the first message; either of the second signaling and the third signaling is received; the first message is used to determine whether there is an RLF-related message.

In one embodiment, the first node U01A is in connection with the third node N03A and the fourth node N04A through Dual Connectivity, the third node N03A being an MN, and the fourth node N04A being an SN.

In one embodiment, the third node N03A comprises an MN, the MN is associated with an MCG, and the MCG comprises one PCell and M1 SCell(s), M1 being a non-negative integer.

In one embodiment, the fourth node N04A comprises an SN, the SN is associated with an SCG, and the SCG comprises one PSCell and M2 SCell(s), M2 being a non-negative integer.

In one embodiment, the first node U01A determines that the radio connection failure comprises that a radio link failure occurs to the MCG.

In one embodiment, the first node U01A determines that the radio connection failure comprises that a radio link failure occurs to the SCG.

In one embodiment, the phrase that "chooses a first target cell as a response to the determined radio connection failure" includes the meaning of choosing to perform RRC Reestablishment or RRC Connection Recovery as a response to the determined radio connection failure.

In one embodiment, the phrase that "chooses a first target cell as a response to the determined radio connection failure" includes the meaning of choosing to transmit the sixth signaling to the third node N03A or transmit the fourth signaling to the second node N02A as a response to the determined radio connection failure.

In one embodiment, the phrase that "chooses a first target cell as a response to the determined radio connection failure" comprises the meaning that if the first node U01A is configured to perform MCG Recovery, the first target cell comprises the PCell; otherwise, the first target cell comprises a cell determined by the first node U01A through Cell Selection.

In one embodiment, the first target cell comprises a source serving cell.

In one embodiment, the first target cell comprises a PCell.

In one embodiment, the first target cell comprises a cell determined through Cell Selection.

In one embodiment, the first target cell is associated with the second node N02A.

In one embodiment, the first target cell is associated with the third node N03A.

In one embodiment, the phrase of choosing a first target cell comprises determining the first target cell.

In one embodiment, the first transmitter transmits a sixth signaling, the sixth signaling being used to indicate that a radio connection failure is determined for MCG.

In one embodiment, the receiver of the sixth signaling includes the third node N03A.

In one embodiment, the receiver of the sixth signaling includes the fourth node N04A.

In one embodiment, the sixth signaling is transmitted via an air interface.

In one embodiment, the sixth signaling is transmitted via a wireless interface.

In one embodiment, the sixth signaling is transmitted via a higher layer signaling.

In one embodiment, a signaling radio bearer bearing the sixth signaling includes a SplitSRB1.

In one embodiment, a signaling radio bearer bearing the sixth signaling includes an SRB3.

In one embodiment, when the SRB3 is configured, the sixth signaling is transmitted to the fourth node N04A through the SRB3; when the SRB3 is not configured, the sixth signaling is transmitted to the third node N03A through the SRB1.

In one embodiment, a logical channel bearing the sixth signaling includes a DCCH.

In one embodiment, the sixth signaling comprises a higher layer signaling.

In one embodiment, the sixth signaling comprises all or part of a higher layer signaling.

In one embodiment, the sixth signaling comprises an RRC message.

In one embodiment, the sixth signaling comprises all or part of IEs in an RRC message.

In one embodiment, the sixth signaling comprises all or part of fields of an IE in an RRC message.

In one embodiment, the sixth signaling comprises the RLF-related message.

In one embodiment, the sixth signaling comprises a measurement result of the MCG.

In one embodiment, the sixth signaling comprises a cause of an MCG failure.

In one embodiment, the sixth signaling comprises a measurement result of an SCG.

In one embodiment, the sixth signaling comprises a MCGFailureInformation message.

In one embodiment, the first signaling is used for configurations for recovery of an MCG failure.

In one embodiment, the first signaling comprises a DLInformationTransferMRDC message.

In one embodiment, the first signaling comprises a dl-DCCH-MessageNR IE.

In one embodiment, the first signaling is used to transmit a RRCReconfiguration message.

In one embodiment, the first signaling is used to transmit a RRCRelease message.

In one embodiment, the first signaling comprises a dl-DCCH-MessageEUTRA IE.

In one embodiment, the first signaling is used to transmit a RRCConnectionReconfiguration message.

In one embodiment, the first signaling is used to transmit a RRCConnectionRelease message.

In one embodiment, a signaling radio bearer bearing the first signaling includes an SRB3.

In one embodiment, the transmitter of the first signaling includes the fourth node N04A.

In one embodiment, the phrase of the first signaling indicating a first candidate cell set comprises the meaning that the first signaling is associated with the first candidate cell set.

In one embodiment, the phrase of the first signaling indicating a first candidate cell set comprises the meaning that the first signaling is related to the first candidate cell set.

In one embodiment, the phrase of the first signaling indicating a first candidate cell set comprises the meaning that the first signaling is used for configurations for the first candidate cell set.

In one embodiment, the first candidate cell set comprises an MCG.

In one embodiment, the first candidate cell set comprises a PCell.

In one embodiment, the first candidate cell set comprises a source cell.

In one embodiment, the first candidate cell set is associated with the third node N03A.

In one embodiment, the phrase that "clears the RLF-related message; the first target cell is a candidate cell in the first candidate cell set" comprises the meaning that clears the RLF-related message as a response to the first target cell being a candidate cell in the first candidate cell set.

In one embodiment, the phrase that "clears the RLF-related message; the first target cell is a candidate cell in the first candidate cell set" comprises the meaning that clears the RLF-related message when the first target cell is the PCell.

In one embodiment, the phrase that "clears the RLF-related message; the first target cell is a candidate cell in the first candidate cell set" comprises the meaning that clears the RLF-related message when a Fast MCG Recovery is performed.

In one embodiment, the phrase that "transmits a third signaling when the first target cell is a candidate cell in the first candidate cell set" means that when the first target cell is a PCell in an MCG, the third signaling is transmitted.

In one embodiment, the third signaling is used to determine that RRC Connection Reconfiguration is successfully completed.

In one embodiment, the receiver of the third signaling includes the third node N03A.

In one embodiment, the receiver of the third signaling includes the PCell.

In one embodiment, the third signaling comprises a RRCReconfigurationComplete message.

In one embodiment, the third signaling comprises a RRCConnectionReconfigurationComplete message.

In one embodiment, the third signaling does not comprise the first message.

In one embodiment, the third signaling is used to indicate that the RLF-related message does not exist in the first node U01A.

In one embodiment, the phrase that "transmits a second signaling when the first target cell does not belong to the first candidate cell set" comprises the meaning that when the first target cell is a cell determined through Cell Selection, the second signaling is transmitted.

In one embodiment, the fourth signaling comprises a RRCReestablishmentRequest message.

In one embodiment, the fourth signaling comprises a RRCConnectionReestablishmentRequest message.

In one embodiment, the fifth signaling comprises a RRCReestablishment message.

In one embodiment, the fifth signaling comprises a RRCConnectionReestablishment message.

In one embodiment, the second signaling is used to determine that RRC Reestablishment is successfully completed.

In one embodiment, the receiver of the second signaling includes the second node N02A.

In one embodiment, the receiver of the second signaling includes a maintenance base station for a cell other than the first target cell.

In one embodiment, the second signaling comprises a RRCReestablishmentComplete message.

In one embodiment, the second signaling comprises a RRCConnectionReestablishmentComplete message.

In one embodiment, the second signaling is used to indicate that the RLF-related message exists in the first node U01A.

In one embodiment, clearing the RLF-related message before the third signaling is transmitted.

In one embodiment, clearing the RLF-related message after the third signaling is transmitted.

In one embodiment, when the third signaling is transmitted, the second message is not used for requesting the RLF report.

In one embodiment, when the third signaling is transmitted, the second message does not comprise rlf-ReportReq.

In one embodiment, when the third signaling is transmitted, the third information set does not comprise the first sub-information-block.

In one embodiment, when the third signaling is transmitted, the third information set does not comprise the RLF-related message.

In one embodiment, the broken-line framed boxes F1A, F2A and F3A are used to implement RRC Connection Recovery.

In one embodiment, the broken-line framed box F4A is used to implement RRC Reestablishment.

In one embodiment, the broken-line framed box F1A is optional.

In one embodiment, the broken-line framed box F2A is optional.

In one embodiment, the broken-line framed box F3A is optional.

In one embodiment, the broken-line framed box F4A is optional.

In one embodiment, the broken-line framed box F1A exists, while the broken-line framed box F2A does not exist.

In one embodiment, the broken-line framed box F1A does not exist, while the broken-line framed box F2A exists.

In one embodiment, the broken-line framed box F3A exists, while the broken-line framed box F4A does not exist.

In one embodiment, the broken-line framed box F3A does not exist, while the broken-line framed box F4A exists.

Embodiment 6B

Embodiment 6B illustrates a schematic diagram of an initiator and a transmitter of a first signaling according to one embodiment of the present disclosure. A first node U01B is a UE; a first network device N02B and a second network device N03B are two base stations.

In Embodiment 6B, the first network device N02B is a master node of the first node U01B, and the second network device N03B is a secondary node of the first node U01B.

In one embodiment, boxes E1B, E2B and E3B respectively represent three possibilities of the initiator and the transmitter of the first signaling.

In one embodiment, the box E1B represents that the first signaling is initiated by the first network device N02B, and the first signaling is transmitted by the first network device N02B.

In one embodiment, the box E1B represents that the first signaling is transmitted by an SRB1.

In one embodiment, the box E2B represents that the first signaling is initiated by the second network device N03B, and the first signaling is transmitted by the second network device N03B.

In one embodiment, the box E2B represents that the first signaling is transmitted by an SRB3.

In one embodiment, the box E1B represents that the first signaling is initiated by the second network device N03B, and the first signaling is transmitted by the first network device N02B.

In one embodiment, the box E3B represents that the first signaling is transmitted by an SRB1.

In one embodiment, the box E3B represents that the first signaling is not transmitted directly from a network node to the first node U01B, but instead is transmitted through forwarding.

In one embodiment, at least one of the boxes E1B, E2B and E3B exists.

In one embodiment, the third signaling and the first signaling in the present disclosure are transmitted in a same way.

In one embodiment, the first signaling is transmitted through the box E1B, and the third signaling is transmitted through the box E3B.

In one embodiment, the first signaling is transmitted through the box E1B, and the third signaling is transmitted through the box E2B.

Embodiment 7A

Embodiment 7A illustrates a schematic diagram of generating and clearing RLF-related message according to one embodiment of the present disclosure. In FIG. 7A, each box represents a step. It should be noted particularly that the order in which the boxes are arranged does not imply a chronological sequence of each step respectively marked.

In Embodiment 7A, a first node receives a first signaling in step S701A; determines a radio connection failure in step S702A; generates an RLF-related message as a response to the determined radio connection failure in step S703A; and chooses a first target cell in step S704A, the first target cell belonging to a first candidate cell set; transmits a third signaling in step S705A; and clears the RLF-related message in step S706A.

In one embodiment, the transmitter of the first signaling comprises the first target cell.

In one embodiment, the first signaling comprises a RRCReconfiguration message.

In one embodiment, the first signaling comprises a RRC-ConnectionReconfiguration message.

In one embodiment, the radio connection failure comprises an MCG RLF.

In one embodiment, the radio connection failure comprises failure in MCG re-configuration with sync.

In one embodiment, the radio connection failure triggers Cell Selection, and a cell selected by the Cell Selection is a first target cell.

In one embodiment, the first signaling comprises a first indicator, and the first indicator is used to indicate whether the first node is allowed to try the first configuration in the present disclosure.

In one embodiment, the first indicator is used to indicate that after the radio connection failure, if a first cell selected is a cell in the first candidate cell set, the first node can execute the first configuration.

In one subembodiment, the first indicator is set to be used for indicating that the first node is allowed to try the first configuration in the present disclosure.

In one subembodiment, the first indicator is not set to be used for indicating that the first node is not allowed to try the first configuration in the present disclosure.

In one subembodiment, the phrase of "set to be" means existing, and the phrase of "not set to be" means not existing.

In one subembodiment, the first indicator is a field in the first signaling.

In one subembodiment, the first indicator comprises a attemptCondReconfig field.

In one subembodiment, the first indicator comprises an attemptCondReconf field.

In one embodiment, the first indicator is configured in the first signaling.

In one embodiment, the phrase that "the first target cell belongs to the first candidate cell set" means that the first target cell is a cell in the first candidate cell set.

In one embodiment, if the first target cell belongs to the first candidate cell set, the first node applies the first configuration, the first configuration being associated with the first target cell.

In one embodiment, as a response to the application of the first configuration, the first node transmits the third signaling.

In one embodiment, the third signaling comprises a RRC-ConnectionReconfigurationComplete message.

In one embodiment, the third signaling comprises a RRCReconfigurationComplete message.

In one embodiment, the third signaling does not comprise the first message in the present disclosure.

In one embodiment, the first node does not add the first message to the third signaling.

In one embodiment, the first node does not include the first message when configuring content of the third signaling.

In one embodiment, when the content of the third signaling is configured, there is the RLF-related message in the first node.

In one embodiment, when the content of the third signaling is configured, the first node has the RLF-related message in the VarRLF-Report.

In one embodiment, as a response to transmitting the third signaling, the first node clears the RLF-related message.

In one embodiment, after the third signaling is transmitted successfully, the first node clears the RLF-related message.

In one embodiment, the step S801A of receiving the first signaling is before the step S802A of determining the radio connection failure.

In one embodiment, the step S801A of receiving the first signaling is after the step S802A of determining the radio connection failure.

Embodiment 7B

Embodiment 7B illustrates a schematic diagram of a condition for the first signaling comprising the first identity according to one embodiment of the present disclosure.

In Embodiment 7B, when the initiator of the first signaling is different from the transmitter of the first signaling, the first signaling comprises the first identity; otherwise, the first signaling does not comprise the first identity.

In one embodiment, the phrase that the initiator of the first signaling is different from the transmitter of the first signaling comprises the meaning that the initiator of the first signaling is not the transmitter of the first signaling.

In one embodiment, the phrase that the initiator of the first signaling is different from the transmitter of the first signaling comprises the meaning that the initiator of the first signaling is the first network device, and the transmitter of the first signaling is the second network device.

In one embodiment, the phrase that the initiator of the first signaling is different from the transmitter of the first signaling comprises the meaning that the initiator of the first signaling is the first network device, the first network device transmits information contained in the first signaling to the second network device, and the second network device transmits the first signaling to the first node.

In one embodiment, the phrase that the initiator of the first signaling is different from the transmitter of the first signaling comprises the meaning that the initiator of the first signaling is the first network device, and the first signaling is forwarded from the second network device to the first node.

In one embodiment, when the initiator of the first signaling is the same as the transmitter of the first signaling, the first signaling does not comprise the first identity.

In one subembodiment, the phrase that the initiator of the first signaling is the same as the transmitter of the first signaling comprises the meaning that the initiator of the first signaling is the first network device, and the transmitter of the first signaling is also the first network device.

In one subembodiment, the phrase that the initiator of the first signaling is the same as the transmitter of the first signaling comprises the meaning that the initiator of the first signaling is the second network device, and the transmitter of the first signaling is also the second network device.

In one subembodiment, the phrase that the first signaling does not comprise the first identity comprises the meaning that the first signaling implies the first identity.

In one subembodiment, the phrase that the first signaling does not comprise the first identity comprises the meaning that any field of the first signaling does not comprise the first identity.

In one embodiment, when the initiator of the first signaling is an MN and the transmitter of the first signaling is an SN, the first signaling comprises the first identity.

In one embodiment, when the initiator of the first signaling is an MN and the transmitter of the first signaling is an MN, the first signaling does not comprise the first identity.

In one embodiment, when the initiator of the first signaling is an SN and the transmitter of the first signaling is an SN, the first signaling does not comprise the first identity.

Embodiment 8A

Embodiment 8A illustrates a schematic diagram of generating and clearing RLF-related message according to another embodiment of the present disclosure, as shown in FIG. 8A. In FIG. 8A, each box represents a step. It should be noted particularly that the order in which the boxes are arranged does not imply a chronological sequence of each step respectively marked.

In Embodiment 8A, the first node receives a first signaling in step S801A; determines a radio connection failure in step S802A; generates an RLF-related message as a response to the determined radio connection failure in step S803A; and chooses a first target cell in step S804A, the first target cell belonging to a first candidate cell set; clears the RLF-related message in step S805A; and transmits a third signaling in step S806A.

In one embodiment, the transmitter of the first signaling comprises the first target cell.

In one embodiment, the first signaling comprises a RRCReconfiguration message.

In one embodiment, the first signaling comprises a RRC-ConnectionReconfiguration message.

In one embodiment, the radio connection failure comprises an MCG RLF.

In one embodiment, the radio connection failure comprises failure in MCG re-configuration with sync.

In one embodiment, the radio connection failure triggers Cell Selection, and a cell selected by the Cell Selection is a first target cell.

In one embodiment, the first node is allowed to try the first configuration in the present disclosure.

In one embodiment, the phrase that the first target cell belongs to the first candidate cell set comprises the meaning that the first target cell is a cell in a first candidate cell set.

In one embodiment, the phrase that the first target cell belongs to the first candidate cell set comprises the meaning that the first target cell is a CHO candidate cell.

In one embodiment, if the first target cell belongs to the first candidate cell set, the first node applies the first configuration, the first configuration being associated with the first target cell.

In one embodiment, as a response to the application of the first configuration, the first node clears the RLF-related message.

In one embodiment, as a response to choosing the first target cell, the first node clears the RLF-related message.

In one embodiment, before the third signaling is transmitted, the first node clears the RLF-related message.

In one embodiment, after the RLF-related message is cleared, the first node transmits the third signaling.

In one embodiment, after the RLF-related message is cleared, the first node does not have the RLF-related message in a VarRLF-Report.

In one embodiment, as a response to clearing the RLF-related message, when the first node configures the third signaling, the third signaling does not comprise the first message in the present disclosure.

In one embodiment, the phrase that the third signaling does not comprise the first message in the present disclosure means that the first node does not add the first message to the third signaling.

In one embodiment, when the third signaling is configured, the first node does not have the RLF-related message in a VarRLF-Report.

In one embodiment, when the third signaling is configured, the RLF-related message in the VarRLF-Report is already cleared.

In one embodiment, the third signaling comprises a RRC-ConnectionReconfigurationComplete message.

In one embodiment, the third signaling comprises a RRCReconfigurationComplete message.

In one embodiment, the step S801A of receiving the first signaling is before the step S802A of determining the radio connection failure.

In one embodiment, the step S801A of receiving the first signaling is after the step S802A of determining the radio connection failure.

Embodiment 8B

Embodiment 8B illustrates a schematic diagram of a condition for transmitting a fifth signaling according to one embodiment of the present disclosure, as shown in FIG. 8B.

In Embodiment 8B, only when the initiator of the first signaling and the transmitter of the first signaling are both a secondary node will the fifth signaling be transmitted; otherwise, the fifth signaling are not transmitted.

In one embodiment, the secondary node is a node associated with an SCG.

In one embodiment, the secondary node is an SN.

In one embodiment, the phrase that "only when the initiator of the first signaling and the transmitter of the first signaling are both a secondary node will the fifth signaling be transmitted" means that only when the initiator of the first signaling is a secondary node and the transmitter of the first signaling is the secondary node will the fifth signaling be transmitted.

In one embodiment, the phrase that "only when the initiator of the first signaling and the transmitter of the first signaling are both a secondary node will the fifth signaling be transmitted" means that only when the first signaling is directly transmitted from the secondary node to the first node through an SRB3 will the fifth signaling be transmitted.

In one embodiment, the phrase that "only when the initiator of the first signaling and the transmitter of the first signaling are both a secondary node will the fifth signaling be transmitted" means that when the first signaling is transmitted through an SRB1 will the fifth signaling be transmitted.

In one embodiment, the phrase that "only when the initiator of the first signaling and the transmitter of the first signaling are both a secondary node will the fifth signaling be transmitted" means that when the initiator of the first signaling is a master node and the transmitter of the first signaling is the master node, the fifth signaling is not to be transmitted.

In one embodiment, the phrase that "only when the initiator of the first signaling and the transmitter of the first signaling are both a secondary node will the fifth signaling be transmitted" means that when the initiator of the first signaling is a secondary node and the transmitter of the first signaling is a master node, the fifth signaling is not to be transmitted.

Embodiment 9A

Embodiment 9A illustrates a schematic diagram of a first signaling indicating a first condition and a first configuration according to one embodiment of the present disclosure, as shown in FIG. 9A.

In Embodiment 9A, the first signaling indicates a first condition and a first configuration, the first configuration being associated with the first target cell, and the first target cell fulfilling the first condition is used to trigger application of the first configuration.

In one embodiment, the phrase that the first signaling indicates a first condition and a first configuration means that the first signaling comprises the first condition and the first configuration.

In one embodiment, the phrase that the first signaling indicates a first condition and a first configuration means that the first condition and the first configuration are respectively one or more fields in the first signaling.

In one embodiment, the first condition comprises an Execution Condition.

In one embodiment, the first condition is used to determine a condition for application of the first configuration.

In one embodiment, the first condition is used to determine a condition for triggering execution of Conditional Reconfiguration.

In one embodiment, the first condition is used to determine an execution condition for the CHO in the present disclosure.

In one embodiment, the first condition is used to determine an execution condition for the conditional PSCell Change in the present disclosure.

In one embodiment, the first condition comprises a condExecutionCond field.

In one embodiment, the first condition comprises a triggerCondition field.

In one embodiment, the first configuration is related to the first target cell.

In one embodiment, the first configuration comprises RRC Configuration of the first target cell.

In one embodiment, the first configuration comprises a condRRCReconfig field.

In one embodiment, the first configuration comprises a condReconfigurationToApply field.

In one embodiment, the phrase that the first target cell fulfilling the first condition is used to trigger application of the first configuration means that when the first condition is fulfilled, the first configuration of the first target cell is applied by the first node.

In one embodiment, when the radio connection is failed, if a cell selected is the first target cell, there is no need for evaluating the first condition when applying the first configuration.

In one embodiment, when the first configuration is executed, the first condition is fulfilled.

In one embodiment, when the first configuration is executed, the first condition is unfulfilled.

Embodiment 9B

Embodiment 9B illustrates a schematic diagram of how a first node relates to a first network device and a second network device according to one embodiment of the present disclosure, as shown in FIG. 9B. in FIG. 9B, the first node is a UE, the first network device and the second network device are two Base stations (BSs) respectively; two solid lines respectively represent a link between the first node and the first network device and a link between the first node and the second network device; while the broken line represents a link between the first network device and the second network device.

In Embodiment 9B, the first node is in connection with the first network device and the second network device at the same time.

In one embodiment, the first node has an RRC state, with the RRC terminated at a Master Node (MN), and between the first node and a Core Network (CN) there is only one Control Plane (CP) connected.

In one embodiment, the first network device and the second network device are connected via an Xn interface.

In one embodiment, the first network device and the second network device are connected via an Xn-C interface.

In one embodiment, there is a non-ideal backhaul between the first network device and the second network device.

In one embodiment, there is an ideal backhaul between the first network device and the second network device.

In one embodiment, the first node and the second network device are connected via a Uu interface.

In one embodiment, the first node and the first network device are connected via a Uu interface.

In one embodiment, the first node is a UE supporting Dual Connectivity.

In one embodiment, the first node supports Multi-Radio Dual Connectivity (MR-DC).

In one embodiment, the first node supports NR-NR Dual Connectivity (NR DC).

In one embodiment, the first node supports Intra-E-UTRA DC.

In one embodiment, the first node supports NR E-UTRA Dual Connectivity (NE-DC).

In one embodiment, the first node supports E-UTRA NR Dual Connectivity with E-UTRA connected to 5GC (NGEN-DC).

In one embodiment, the first node supports E-UTRA NR Dual Connectivity with E-UTRA connected to EPC (EN DC).

In one embodiment, the second network device comprises an MN.

In one embodiment, the second network device comprises a Master eNodeB (MeNB).

In one embodiment, the second network device comprises a Centralized Unit (CU).

In one embodiment, the second network device comprises a node in an MCG.

In one embodiment, the first network device comprises an SN.

In one embodiment, the first network device comprises a Secondary eNodeB (SgNB).

In one embodiment, the first network device comprises a Distributed Unit (DU).

In one embodiment, the first network device comprises a node in an SCG.

In one embodiment, the first network device is an LTE-supporting base station, while the second network device is an NR-supporting base station.

In one embodiment, the first network device and the second network device are both LTE-supporting base stations.

In one embodiment, the first network device is an NR-supporting base station, while the second network device is an LTE-supporting base station.

In one embodiment, the first network device is an NR-supporting base station, and the second network device is an NR-supporting base station.

In one embodiment, the first node, the first network device and the second network device employ a schematic diagram of a Control Plane (CP) architecture of a Radio Protocol Architecture illustrated in 3GPP TS 37.340 and relevant terminology.

In one embodiment, the first node, the first network device and the second network device employ a schematic diagram of a User Plane (UP) architecture of a Radio Protocol Architecture illustrated in 3GPP TS 37.340 and relevant terminology.

In one embodiment, the first node is in connection with the first network device, the second network device and the third network device, the first network device is an MN, while the second network device and the third network device are SNs.

Embodiment 10A

Embodiment 10A illustrates a schematic diagram of a first sub-information-block comprising a first identity and a first condition according to one embodiment of the present disclosure; as shown in FIG. 10A.

In Embodiment 10A, the first sub-information-block comprises a first identity and the first condition, the first identity being used to indicate the first target cell.

In one embodiment, the first identity is related to the first target cell.

In one embodiment, the first identity is used to determine a cell used for RLF recovery.

In one embodiment, the first identity is used to determine the first target cell.

In one embodiment, the first identity comprises a Cell-GlobalIdentity (CGI) of the first target cell.

In one embodiment, the first identity comprises an Evolved Cell Global Identifier (ECGI) of the first target cell.

In one embodiment, the first identity comprises a PhysicalCellIdentity (PCI) of the first target cell.

In one embodiment, the first identity comprises CellGlobalIdEUTRA of the first target cell.

In one embodiment, the first identity comprises CGI-Info-Logging of the first target cell.

In one embodiment, the first identity comprises a reestablishmentCellId.

In one embodiment, the first identity comprises a reconfigurationCellId.

In one embodiment, the first identity comprises a recoveryCellId.

In one embodiment, the first condition is used to determine an execution condition for the first configuration being applied.

In one embodiment, the first condition comprises a condExecutionCond.

In one embodiment, the first condition comprises a triggerCondition.

In one embodiment, the first condition comprises one or more triggering conditions.

In one embodiment, the first condition comprises one or two triggering conditions.

In one embodiment, the first condition comprises an A3 event.

In one embodiment, the first condition comprises an A5 event.

In one embodiment, Trigger Quantities of evaluating the first condition include a Reference Signal Received Power (RSRP).

In one embodiment, Trigger Quantities of evaluating the first condition include a Reference Signal Received Quality (RSRQ).

In one embodiment, Trigger Quantities of evaluating the first condition include a Signal to Interference plus Noise Ratio (SINR).

In one embodiment, Trigger Quantities of evaluating the first condition include an RSRP and an RSRQ.

In one embodiment, Trigger Quantities of evaluating the first condition include an RSRP and a SINR.

In one embodiment, the Trigger Quantities include a Measurement quantity.

In one embodiment, after the radio connection failure, an execution of recovery of the radio connection failure through the CHO in the present disclosure is failed.

In one embodiment, the phrase that the recovery of the radio connection failure is failed means that the first configuration's application is failed.

In one embodiment, after the radio connection failure, an execution of recovery of the radio connection failure through the CHO in the present disclosure is successful.

In one embodiment, the phrase that the recovery of the radio connection failure is successful means that an application of the first configuration is successful.

In one embodiment, after the recovery of the radio connection failure is failed, the procedure of RRC Reestablishment is performed.

In one embodiment, the second signaling is transmitted.

In one embodiment, after a successful recovery of the radio connection failure, the procedure of RRC Connection Reconfiguration is performed.

In one embodiment, the third signaling is transmitted.

In one embodiment, the application of the first configuration is failed, and the second signaling is transmitted.

In one embodiment, when the fourth signaling is configured, a message related to the radio connection failure is stored in the VarRLF-Report, the message related to the radio connection failure comprising the first identity and the first condition.

In one embodiment, when the fourth signaling is configured, a message related to the radio connection failure is stored in the VarRLF-Report, the message related to the radio connection failure comprising the first identity.

In one embodiment, when the fourth signaling is configured, a message related to the radio connection failure is stored in the VarRLF-Report, the message related to the radio connection failure comprising the first condition.

In one embodiment, the phrase that "when the fourth signaling is configured" means before the fourth signaling is transmitted.

In one embodiment, when the first target cell is a candidate cell in the first candidate cell set, and the first node's application of the first configuration is failed, the first sub-information-block comprises the message related to the radio connection failure, the radio connection failure comprising the first identity and the first condition.

In one embodiment, the phrase that the first sub-information-block comprises the first identity and the first condition means that the third information set comprises the first identity and the first condition.

In one embodiment, when the first target cell is a candidate cell in the first candidate cell set, and the first node's application of the first configuration is failed, the first transmitter transmits a second signaling, the second signaling comprising the first message.

Embodiment 10B

Embodiment 10B illustrates a schematic diagram of a second identity being used to indicate a type of a first target cell according to one embodiment of the present disclosure.

In Embodiment 10B, the first node receives the first signaling; herein, the first signaling is used to determine the first parameter set, the first parameter set comprises the first candidate cell and the first condition, the first condition is used to determine whether to change the first candidate cell to the first target cell, and the first parameter set is associated with the second identity, the second identity being used to indicate a type of the first target cell.

In one embodiment, the first signaling comprises a RRCReconfiguration message.

In one embodiment, the first parameter set is one or more IEs in the first signaling.

In one embodiment, the first parameter set is used for configurations for Conditional PSCell Addition/Change (CPAC) or PCell Conditional Handover (PCHO), the CPAC comprises CPC and CPA.

In one embodiment, the first condition is an Execution Condition.

In one embodiment, when the first condition is fulfilled, the first candidate cell is changed to be the first target cell.

In one embodiment, when the first condition is fulfilled, the first node performs CPA.

In one embodiment, when the first condition is fulfilled, the first node performs CPC.

In one embodiment, when the first condition is fulfilled, the first node performs CHO.

In one embodiment, the phrase that the first parameter set is associated with the second identity includes the meaning that the first parameter set comprises the second identity.

In one embodiment, the phrase that the first parameter set is associated with the second identity includes the meaning that the second identity indicates that the first parameter set is employed in a PCell or a PSCell.

In one embodiment, a type of the first target cell includes the PCell.

In one embodiment, a type of the first target cell includes the PSCell.

In one embodiment, a type of the first target cell includes an SPCell of a master node.

In one embodiment, a type of the first target cell includes an SPCell of a secondary node.

In one embodiment, the phrase of the second identity being used to indicate a type of the first target cell means that the first node determines through the second identity that the first candidate cell and the first condition are employed for the type of the first target cell.

Embodiment 11A

Embodiment 11A illustrates a schematic diagram of a first signaling comprising K1 first-type signaling(s) according to one embodiment of the present disclosure, as shown in FIG. 11A.

In Embodiment 11A, the first signaling comprising K1 first-type signaling(s); any sub-signaling of the K1 first-type signaling(s) is used to indicate all or part of the first candidate cell set; K1 is a positive integer.

In one embodiment, any sub-signaling of the K1 first-type signaling(s) is of a same format as the first signaling.

In one embodiment, any sub-signaling of the K1 first-type signaling(s) differs in format from the first signaling.

In one embodiment, any sub-signaling of the K1 first-type signaling(s) is used for carrying information related to one or more candidate cells in the first candidate cell set.

In one embodiment, the K1 first-type signalings do not belong to a same RRC message.

In one embodiment, candidate cells carried in the K1 first-type signalings make up the first candidate cell set.

In one embodiment, any sub-signaling of the K1 first-type signaling(s) comprises a RRCReconfiguration message.

In one embodiment, any sub-signaling of the K1 first-type signaling(s) comprises a RRCConnectionReconfiguration message.

In one embodiment, any sub-signaling of the K1 first-type signaling(s) comprises a ConditionalReconfigurationIE.

In one embodiment, any sub-signaling of the K1 first-type signaling(s) comprises a ConditionalReconfiguration IE.

In one embodiment, the K1 first-type signalings have a same transmitter.

In one embodiment, the K1 first-type signalings have different transmitters.

In one embodiment, the K1 first-type signalings are used for configurations for CHO.

In one embodiment, the K1 first-type signalings are used for configurations for CPC.

In one embodiment, one of the K1 first-type signaling(s) is transmitted by an SRB1.

In one embodiment, one of the K1 first-type signaling(s) is transmitted by an SRB3.

Embodiment 11B

Figures 11B, 12A, 12B, 13:
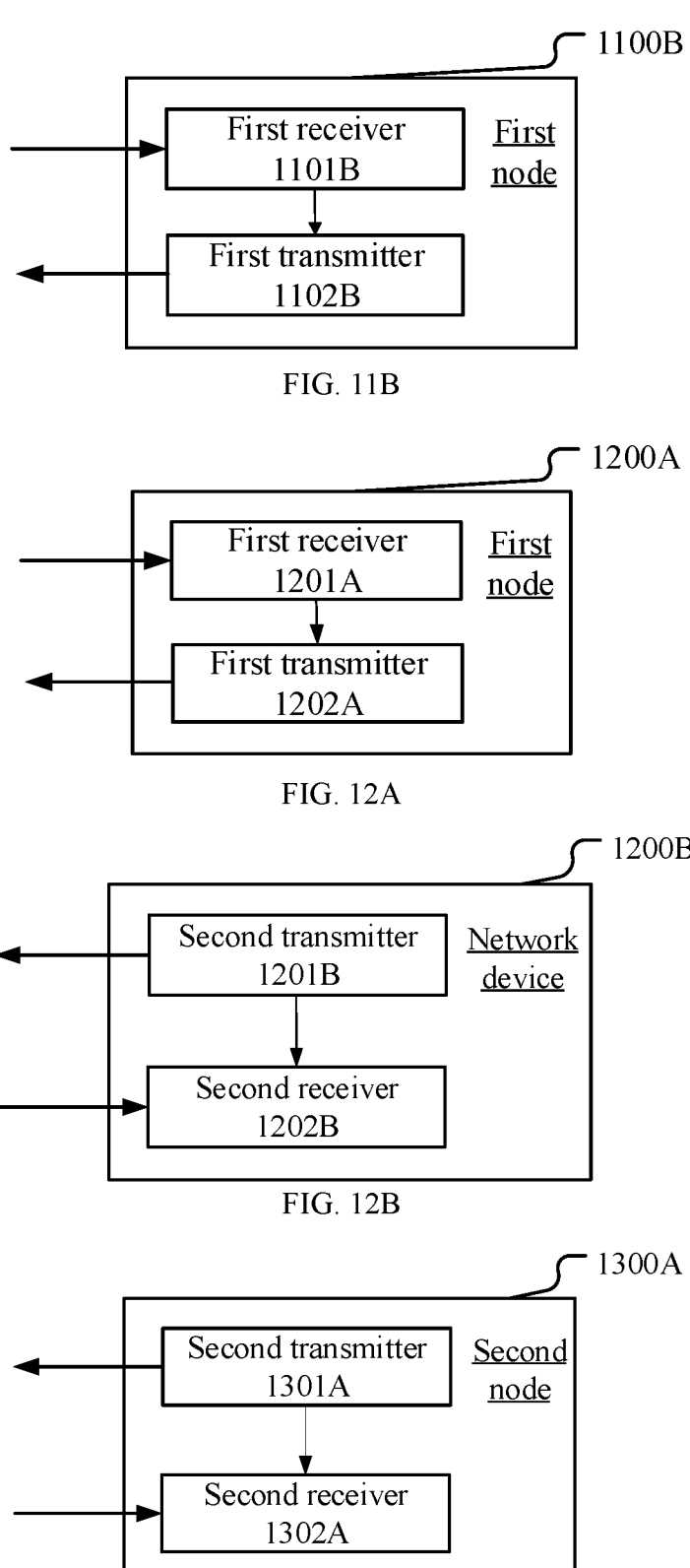
FIG. 11B illustrates a structure block diagram of a processing device in a first node according to one embodiment of the present disclosure.
FIG. 12A illustrates a structure block diagram of a processing device in a first node according to one embodiment of the present disclosure.
FIG. 12B illustrates a structure block diagram of a processing device in a network device according to one embodiment of the present disclosure.
FIG. 13 illustrates a structure block diagram of a processing device in a second node according to one embodiment of the present disclosure.

Embodiment 11B illustrates a structure block diagram of a processing device in a first node according to one embodiment of the present disclosure; as shown in FIG. 11B. In FIG. 11B, a processing device 1100B in a first node comprises a first receiver 1101B and a first transmitter 1102B.

The first receiver 1101B receives a first signaling.

The first transmitter 1102B transmits a second signaling.

In Embodiment 11B, the first signaling is used for radio resource control reconfiguration; the second signaling is used for an acknowledgement of the radio resource control reconfiguration; the first signaling is associated with a first identity, the first identity is related to an initiator of the first signaling, and the first identity is used to determine a receiver of the second signaling; the initiator of the first signaling includes a first network device or a second network device, and the first node is in connection with both the first network device and the second network device, the first network device being associated with a first-type node and the second network device being associated with a second-type node; the first-type node is different from the second-type node.

In one embodiment, the first signaling is used to determine a first parameter set, the first parameter set comprises a first condition and a first candidate cell, and the first parameter set is associated with a second identity; the first condition is used to determine whether the first candidate cell is changed to a first target cell, the target cell being a Primary Cell (PCell) in a first cell group, and the first cell group being associated with either the first-type node or the second-type node; the second identity is related to the initiator of the first signaling, or the second identity is related to the first target cell.

In one embodiment, the first receiver 1101B receives a third signaling; herein, the third signaling is used to determine a second parameter set, the second parameter set comprises a second condition and the first candidate cell, and the second parameter set is associated with the second identity; the second condition is used to determine whether the first candidate cell is changed to a first target cell; an initiator of the first signaling is different from that of the third signaling; when the first condition conflicts with the second condition, the first node selects one of the first condition and the second condition to determine whether to change the first candidate cell to the first target cell.

In one embodiment, the first receiver 1101B receives a fourth signaling; herein, the fourth signaling is used to determine priority of the first condition or the second condition.

In one embodiment, when the initiator of the first signaling is different from the transmitter of the first signaling, the first signaling comprises the first identity.

In one embodiment, the first transmitter 1102B transmits a fifth signaling; herein, the fifth signaling is used to indicate that the first candidate cell is changed to the first target cell; a receiver of the fifth signaling is the first network device, or the receiver of the fifth signaling is the second network device.

In one embodiment, only when the initiator of the first signaling and the transmitter of the first signaling are both a secondary node will the fifth signaling be transmitted In one embodiment, the first receiver 1101B comprises the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1101B comprises the antenna 452, the receiver 454, the multi-antenna receiving processor 458, and the receiving processor 456 in FIG. 4 of the present disclosure.

In one embodiment, the first receiver 1101B comprises the antenna 452, the receiver 454 and the receiving processor 456 in FIG. 4 of the present disclosure.

In one embodiment, the first transmitter 1102B comprises the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1102B comprises the antenna 452, the transmitter 454, the multi-antenna transmitting processor 457 and the transmitting processor 468 in FIG. 4 of the present disclosure.

In one embodiment, the first transmitter 1102B comprises the antenna 452, the transmitter 454 and the transmitting processor 468 in FIG. 4 of the present disclosure.

Embodiment 12A

Embodiment 12A illustrates a structure block diagram of a processing device in a first node according to one embodiment of the present disclosure; as shown in FIG. 12A. In FIG. 12A, a processing device 1200A in a first node comprises a first receiver 1201A and a first transmitter 1202A.

The first receiver 1201A receives a first signaling, the first signaling indicating a first candidate cell set; determines a radio connection failure; and chooses a first target cell as a response to the determined radio connection failure.

The first transmitter 1202A transmits a second signaling when the first target cell does not belong to the first candidate cell set, the second signaling comprising a first message; or transmits a third signaling when the first target cell is a candidate cell in the first candidate cell set, the third signaling not comprising the first message; either of the second signaling and the third signaling is received.

In Embodiment 12A, the first message is used to determine whether there is an RLF-related message.

In one embodiment, the first receiver 1201A receives a second message; the first transmitter 1202A transmits a third information set; herein, the second message is used to trigger transmission of the third information set, the third information set comprising a first sub-information-block, the first sub-information-block comprising the RLF-related message; the first target cell does not belong to the first candidate cell set.

In one embodiment, the first transmitter 1202A transmits a fourth signaling; the first receiver 1201A receives a fifth signaling; herein, the fifth signaling is used to trigger the second signaling.

In one embodiment, the first receiver 1201A generates the RLF-related message as a response to the determined radio connection failure.

In one embodiment, the first receiver 1201A clears the RLF-related message; herein, the first target cell is a candidate cell in the first candidate cell set.

In one embodiment, the first signaling indicates a first condition and a first configuration, the first configuration being associated with the first target cell, and the first target cell fulfilling the first condition is used to trigger application of the first configuration.

In one embodiment, the first sub-information-block comprises a first identity and the first condition, the first identity being used to indicate the first target cell.

In one embodiment, the first receiver 1201A comprises the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201A comprises the antenna 452, the receiver 454, the multi-antenna receiving processor 458 and the receiving processor 456 in FIG. 4 of the present disclosure.

In one embodiment, the first receiver 1201A comprises the antenna 452, the receiver 454 and the receiving processor 456 in FIG. 4 of the present disclosure.

In one embodiment, the first transmitter 1202A comprises the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1202A comprises the antenna 452, the transmitter 454, the multi-antenna transmitting processor 457 and the transmitting processor 468 in FIG. 4 of the present disclosure.

In one embodiment, the first transmitter 1202A comprises the antenna 452, the transmitter 454 and the transmitting processor 468 in FIG. 4 of the present disclosure.

Embodiment 12B

Embodiment 12B illustrates a structure block diagram of a processing device in a network device according to one embodiment of the present disclosure; as shown in FIG. 12B. In FIG. 12B, a processing device 1200B in a network device comprises a second transmitter 1201B and a second receiver 1202B.

The second transmitter 1201B transmits a first signaling.

The second receiver 1202B receives a second signaling.

In Embodiment 12B, the first signaling is used for radio resource control reconfiguration; the second signaling is used for an acknowledgement of the radio resource control reconfiguration; the first signaling is associated with a first identity, the first identity is related to an initiator of the first signaling, and the first identity is used to determine a receiver of the second signaling; a receiver of the first signaling is in connection with a first network device and a second network device simultaneously, the network device is either the first network device or the second network device, and the initiator of the first signaling includes the first network device or the second network device, the first network device being associated with a first-type node and the second network device being associated with a second-type node; the first-type node is different from the second-type node.

In one embodiment, the first signaling is used to determine a first parameter set, the first parameter set comprises a first condition and a first candidate cell, and the first parameter set is associated with a second identity; the first condition is used to determine whether the first candidate cell is changed to a first target cell, the target cell being a Primary Cell (PCell) in a first cell group, and the first cell group being associated with either the first-type node or the second-type node; the second identity is related to the initiator of the first signaling, or the second identity is related to the first target cell.

In one embodiment, the second transmitter 1201B transmits a third signaling; herein, the third signaling is used to determine a second parameter set, the second parameter set comprises a second condition and the first candidate cell, and the second parameter set is associated with the second identity; the second condition is used to determine whether the first candidate cell is changed to a first target cell; an initiator of the first signaling is different from that of the third signaling; when the first condition conflicts with the second condition, a receiver of the first signaling selects one of the first condition and the second condition to determine whether to change the first candidate cell to the first target cell.

In one embodiment, the second transmitter 1201B transmits a fourth signaling; herein, the fourth signaling is used to determine priority of the first condition or the second condition.

In one embodiment, when the initiator of the first signaling is different from the transmitter of the first signaling, the first signaling comprises the first identity.

In one embodiment, the second receiver 1202B receives a fifth signaling; herein, the fifth signaling is used to indicate that the first candidate cell is changed to the first target cell.

In one embodiment, only when the initiator of the first signaling and the transmitter of the first signaling are both a secondary node is the fifth signaling received.

In one embodiment, the second transmitter 1201B comprises the antenna 420, the transmitter 418, the multi-antenna transmitting processor 471, the transmitting processor 416, the controller/processor 475 and the memory 476 in FIG. 4 of the present disclosure.

In one embodiment, the second transmitter 1201B comprises the antenna 420, the transmitter 418, the multi-antenna transmitting processor 471 and the transmitting processor 416 in FIG. 4 of the present disclosure.

In one embodiment, the second transmitter 1201B comprises the antenna 420, the transmitter 418 and the transmitting processor 416 in FIG. 4 of the present disclosure.

In one embodiment, the second receiver 1202B comprises the antenna 420, the receiver 418, the multi-antenna receiving processor 472, the receiving processor 470, the controller/processor 475 and the memory 476 in FIG. 4 of the present disclosure.

In one embodiment, the second receiver 1202B comprises the antenna 420, the receiver 418, the multi-antenna receiving processor 472 and the receiving processor 470 in FIG. 4 of the present disclosure.

In one embodiment, the second receiver 1202B comprises the antenna 420, the receiver 418 and the receiving processor 470 in FIG. 4 of the present disclosure.

Embodiment 13

Embodiment 13 illustrates a structure block diagram of a processing device in a second node according to one embodiment of the present disclosure; as shown in FIG. 13. In FIG. 13, a processing device 1300A in a second node comprises a second transmitter 1301A and a second receiver 1302A.

The second receiver 1302A receives a second signaling when a target cell does not belong to a first candidate cell set, the second signaling comprising a first message; receives a third signaling when the first target cell is a candidate cell in the first candidate cell set, the third signaling not comprising the first message; either of the second signaling and the third signaling is transmitted.

In Embodiment 13, the first message is used to determine whether there is a Radio Link Failure (RLF)-related message; the first candidate cell set is indicated by a first signaling; and as a response to a radio connection failure, the first target cell is chosen.

In one embodiment, the second transmitter 1301A transmits a second message; the second receiver 1302A receives a third information set; herein, the second message is used to trigger reception of the third information set, the third information set comprising a first sub-information-block, the first sub-information-block comprising the RLF-related message; the first target cell does not belong to the first candidate cell set.

In one embodiment, the second receiver 1302A receives a fourth signaling; the second transmitter 1301A transmits a fifth signaling; herein, the fifth signaling is used to trigger the second signaling.

In one embodiment, generating the RLF-related message as a response to the determined radio connection failure.

In one embodiment, the RLF-related message is cleared; herein the first target cell is a candidate cell in the first candidate cell set.

In one embodiment, the RLF-related message is cleared by the first node in the present disclosure.

In one embodiment, the first signaling indicates a first condition and a first configuration, the first configuration being associated with the first target cell, and the first target cell fulfilling the first condition is used to trigger application of the first configuration.

In one embodiment, the first sub-information-block comprises a first identity and the first condition, the first identity being used to indicate the first target cell.

In one embodiment, the second transmitter 1301A comprises the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301A comprises the antenna 420, the transmitter 418, the multi-antenna transmitting processor 471, and the transmitting processor 416 in FIG. 4 of the present disclosure.

In one embodiment, the second transmitter 1301A comprises the antenna 420, the transmitter 418 and the transmitting processor 416 in FIG. 4 of the present disclosure.

In one embodiment, the second receiver 1302A comprises the antenna 420, the receiver 418, the multi-antenna receiving processor 472, the receiving processor 470, the controller/processor 475 and the memory 476 in FIG. 4 of the present disclosure.

In one embodiment, the second receiver 1302A comprises the antenna 420, the receiver 418, the multi-antenna receiving processor 472, and the receiving processor 470 in FIG. 4 of the present disclosure.

In one embodiment, the second receiver 1302A comprises the antenna 420, the receiver 418 and the receiving processor 470 in FIG. 4 of the present disclosure.

Embodiment 14

Figure 14:
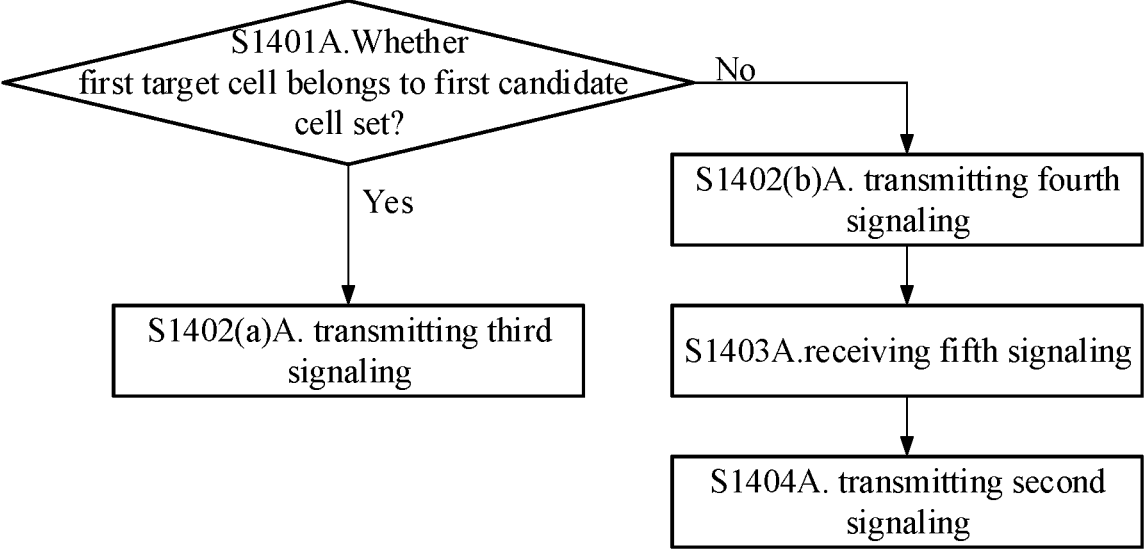
FIG. 14 illustrates a schematic diagram of transmitting a third signaling or a second signaling being related to whether a first target cell belongs to a first candidate cell set according to one embodiment of the present disclosure.

Embodiment 14 illustrates a schematic diagram of transmitting a third signaling or a second signaling being related to whether a first target cell belongs to a first candidate cell set according to one embodiment of the present disclosure, as shown in FIG. 14.

In Embodiment 14, the first node determines in step S1401A whether the first target cell belongs to the first candidate cell set; if the first target cell belongs to the first candidate cell set, the first node transmits the third signaling in step S1402(*a*)A; if the first target cell does not belong to the first candidate cell set, the first node transmits the fourth signaling in step S1402(*b*)A and receives a fifth signaling in S1403A, and transmits the second signaling in step S1404A.

In one embodiment, when the first target cell does not belong to the first candidate cell set, the second signaling is transmitted, the second signaling comprising a first message; when the first target cell belongs to the first candidate cell set, the third signaling is transmitted, the third signaling not comprising the first message.

In one embodiment, the step S1402(*a*)A is used for executing RRC Connection Reconfiguration.

In one embodiment, the step S1402(*b*)A, the step S1403A and the step S1404A are used for executing RRC Reestablishment.

In one embodiment, the first target cell comprises a cell selected by Cell Selection procedure.

In one embodiment, the first target cell comprises a PCell.

In one embodiment, the first candidate cell set comprises a CHO candidate cell table.

In one embodiment, the first candidate cell set comprises an MCG.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (TOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

The invention claimed is:

1. A user equipment (UE) for wireless communications, the UE comprising:

a transceiver; and a processor, wherein the transceiver and the processor are configured to:

receives a first signaling, wherein the first signaling is used for configurations for a first candidate cell set;, determine a radio connection failure; and determine a first target cell as a response to the determined radio connection failure, transmits a second signaling on a condition that the first target cell does not belong to the first candidate cell set, the second signaling comprising a first message, or transmits a third signaling on a condition that the first target cell is a candidate cell in the first candidate cell set, the third signaling not comprising the first message, and wherein either of the second signaling and the third signaling is transmitted, receives a second message transmits a third information set, wherein the first message is used to determine whether there is a Radio Link Failure (RLF)-related message, and wherein the second message is used to trigger transmission of the third information set, and wherein the third information set comprises a first sub-information-block, the first sub-information-block comprising the RLF-related message, and wherein the first target cell does not belong to the first candidate cell set.

2. The UE according to claim 1, wherein the transceiver and the processor are further configured to:

transmit a fourth signaling, and receive a fifth signaling, wherein the fifth signaling is used to trigger the second signaling, and wherein the fourth signaling is used to trigger the fifth signaling.

3. The first node according to claim 1, wherein the transceiver and the processor are further configured to:

generate the RLF-related message as a response to the determined radio connection failure.

4. The UE according to claim 1, wherein the transceiver and the processor are further configured to:

clear the RLF-related message;

wherein the first target cell is a candidate cell in the first candidate cell set.

5. The UE according to claim 1, wherein the transceiver and the processor are further configured to:

transmit a sixth signaling, wherein the sixth signaling being used to indicate that a radio connection failure is determined for MCG, and wherein a signaling radio bearer bearing the sixth signaling includes a Split SRB1, or, a signaling radio bearer bearing the sixth signaling includes an SRB3, and wherein the first signaling is triggered by the sixth signaling, and wherein the third signaling is triggered by the first signaling.

6. The UE according to claim 1, wherein a signaling radio bearer for the first signaling includes a Signaling Radio Bearer 1 (SRB1), or the signaling radio bearer for the first signaling includes a Signaling Radio Bearer 3 (SRB3), and wherein the first signaling comprises a RRCReconfiguration message, or the first signaling comprises a RRC-ConnectionReconfiguration message.

7. The UE according to claim 1, wherein on a condition that a timer T310 is expired, the first node determines the radio connection failure, or on a condition that a timer T312 is expired, the first node determines the radio connection failure, or on a condition that an indication that a maximum retransmission number is reached is received from MCG Radio Link Control (RLC), the first node determines the radio connection failure, or on a condition that an indication that a maximum retransmission number of an SRB or a DRB is reached is received from MCG RLC, the first node determines the radio connection failure; or when an indication of random access issue from MCG Medium Access Control (MAC) is received, and none of timers T300, T301, T304, T311 and T319 is running, the first node determines the radio connection failure between a first serving cell, or on a condition that an indication of random access issue from MCG MAC is received, and none of timers T300, T301, T304 and T311 is running, the first node determines the radio connection failure between a first serving cell.

8. The UE according to claim 1, wherein the second signaling is used for an RRC Reestablishment procedure, and wherein the second signaling comprises a RRCReestablishmentComplete message, or the second signaling comprises a RRCConnectionReestablishmentComplete message.

9. The UE according to claim 1, wherein the third signaling is used for an RRC Reconfiguration procedure, and wherein the third signaling comprises a RRCReconfigurationComplete message, or the third signaling comprises a RRCConnectionReconfigurationComplete message.

10. The UE according to claim 1, wherein the RLF-related message is stored in a VarRLF-Report, and wherien the first message comprises rlf-InfoAvailable.

11. The UE according to claim 1, wherein the said generates the RLF-related message contains the following meaning: storing the RLF-related message in the VarRLF-Report.

12. The UE according to claim 1, wherein the RLF-related message comprises at least one of a plmn-IdentityList, a measResultLastServCell IE, a measResultNeighCells IE, a previousPCellId, a failedPCellId, a connectionFailureType or a rlf-Cause.

13. The UE according to claim 1, wherein clearing the RLF-related message includes clearing the RLF-related message stored in the VarRLF-Report.

14. The UE according to claim 2, wherein the fourth signaling comprises a RRCReestablishmentRequest message, and the fifth signaling comprises a RRCReestablishment message; or the fourth signaling comprises a RRCConnectionReestablishmentRequest message, and the fifth signaling comprises a RRCConnectionReestablishment message.

15. The UE according to claim 1, wherein the second message comprises a UEInformationRequest message, and comprises a rlf-ReportReq field, and wherein the third information set comprises a UEInformationResponse message, and wherein the first sub-information-block comprises a rlf-Report field.

16. The UE according to claim 1, comprising:

the first receiver, which clears the RLF-related message before the third signaling is transmitted.

17. A base station for wireless communications, the bases station comprising:

a transceiver; and a processor, wherein the transceiver and the processor are configured to:

receives a second signaling, transmit a second message, receive a third information set when a target cell does not belong to a first candidate cell set, the second signaling comprising a first message; and receive a third signaling when the first target cell is a candidate cell in the first candidate cell set, the third signaling not comprising the first message, wherein either of the second signaling and the third signaling is transmitted, and wherein the first message is used to determine whether there is a Radio Link Failure (RLF)-related message, and wherein a first signaling is used for configurations for the first candidate cell set, and wherein as a response to a radio connection failure, the first target cell is determined, and whererin the second message is used to trigger transmission of the third information set, and wherein the third information set comprises a first sub-information-block, the first sub-information-block comprising the RLF-related message.

18. A method in user equipment (UE) for wireless communications, the method comprising:

receiving a first signaling, the first signaling is used for configurations for a first candidate cell set;

determining a radio connection failure;

determining a first target cell as a response to the determined radio connection failure;

transmitting a second signaling when the first target cell does not belong to the first candidate cell set, the second signaling comprising a first message; or transmitting a third signaling when the first target cell is a candidate cell in the first candidate cell set, the third signaling not comprising the first message, wherein either of the second signaling and the third signaling is transmitted;

receiving a second message; and transmitting a third information set;

wherein the first message is used to determine whether there is a Radio Link Failure (RLF)-related message, and wherein the second message is used to trigger transmission of the third information set, and wherein the third information set comprises a first sub-information-block, the first sub-information-block comprising the RLF-related message, and wherein the first target cell does not belong to the first candidate cell set.

19. A method in a base station for wireless communications, the method comprising:

receiving a second signaling;

transmitting a second message;

receiving a third information set on a condition that a target cell does not belong to a first candidate cell set, the second signaling comprising a first message;

receiving a third signaling on a condition that the first target cell is a candidate cell in the first candidate cell set, the third signaling not comprising the first message, wherein either of the second signaling and the third signaling is transmitted, and wherein the first message is used to determine whether there is a Radio Link Failure (RLF)-related message, and wherein a first signaling is used for configurations for the first candidate cell set, and wherein as a response to a radio connection failure, the first target cell is determined, and wherein the second message is used to trigger transmission of the third information set, and wherein the third information set comprises a first sub-information-block, the first sub-information-block comprising the RLF-related message.

* * * * *